United States Patent [19]

Kahlman

[11] Patent Number: 5,136,436
[45] Date of Patent: Aug. 4, 1992

[54] APPARATUS FOR RECORDING A DIGITAL INFORMATION SIGNAL AND UTILIZING THE DIGITAL SUM VALUE THEREOF TO RECORD AN AUXILIARY DIGITAL SIGNAL, AND APPARATUS FOR REPRODUCING SUCH RECORDED SIGNALS

[75] Inventor: Josephus A. H. M. Kahlman, Eindhoven, Netherlands

[73] Assignee: U.S. Philips Corporation, New York, N.Y.

[21] Appl. No.: 337,242

[22] Filed: Apr. 13, 1989

[30] Foreign Application Priority Data

Apr. 26, 1988 [NL] Netherlands ............... 8801076

[51] Int. Cl.$^5$ .................. G11B 5/09; G11B 20/14; G11B 5/584; H04L 25/34
[52] U.S. Cl. .................. 360/40; 360/77.13; 375/19
[58] Field of Search ............... 360/40, 47, 77.13, 39; 375/19

[56] References Cited

U.S. PATENT DOCUMENTS 4,511,933  4/1985  Hofelt et al. ............... 360/47
4,520,346  5/1985  Shimada ..................... 360/40

Primary Examiner—Aristotelis Psitos
Assistant Examiner—Jefferson Evans
Attorney, Agent, or Firm—Leroy Eason

[57] ABSTRACT

Apparatus for recording a digital information signal and an auxiliary signal in information tracks of a record carrier without adding the auxiliary signal to the recorded signal. The apparatus converts consecutive information words of the information signal into channel words in accordance with a channel code such that at least three channel words of mutually different disparities are available for such conversion. Selection of a particular channel word for a given information word is determined by a control signal derived from the auxiliary signal and which controls such selection so that the digital sum value (DSV) of the recorded channel words varies substantially in accordance with the auxiliary signal. The control signal is produced from the difference between the auxiliary signal and the DSV of the channel words. Both of the recorded signals can be read by apparatus which converts the recorded channel words into the corresponding information words and also converts the DSV of the recorded channel words into the auxiliary signal.

8 Claims, 17 Drawing Sheets

| I | C1 DS | C2 DS | C3 DS |
|---|---|---|---|
| i=1  0 | | | +2 |
| 19 | | | |
| 20 | +2 | -2 | |
| 179 | | | 0 |
| 180 | | | |
| 192 | | | |
| 193 | 4 | -4 | |
| i=256  255 | | | |

| Input | C1 | DS | C2 | DS | C3 | DS | I | C1 | DS | C2 | DS | C3 | DS |
|---|---|---|---|---|---|---|---|---|---|---|---|---|---|
| 0 | 67 | 2 | 68 | -2 | 67 | 2 | 60 | 453 | 2 | 327 | -2 | 231 | 0 |
| 1 | 70 | 2 | 73 | -2 | 70 | 2 | 61 | 455 | 2 | 330 | -2 | 234 | 0 |
| 2 | 76 | 2 | 75 | -2 | 76 | 2 | 62 | 458 | 2 | 333 | -2 | 237 | 0 |
| 3 | 130 | 2 | 78 | -2 | 130 | 2 | 63 | 461 | 2 | 335 | -2 | 239 | 0 |
| 4 | 133 | 2 | 82 | -2 | 133 | 2 | 64 | 463 | 2 | 340 | -2 | 244 | 0 |
| 5 | 135 | 2 | 85 | -2 | 135 | 2 | 65 | 468 | 2 | 345 | -2 | 249 | 0 |
| 6 | 138 | 2 | 87 | -2 | 138 | 2 | 66 | 473 | 2 | 347 | -2 | 251 | 0 |
| 7 | 141 | 2 | 90 | -2 | 141 | 2 | 67 | 475 | 2 | 350 | -2 | 254 | 0 |
| 8 | 143 | 2 | 93 | -2 | 143 | 2 | 68 | 478 | 2 | 369 | -2 | 273 | 0 |
| 9 | 148 | 2 | 95 | -2 | 148 | 2 | 69 | 497 | 2 | 371 | -2 | 275 | 0 |
| 10 | 153 | 2 | 100 | -2 | 153 | 2 | 70 | 499 | 2 | 374 | -2 | 278 | 0 |
| 11 | 155 | 2 | 105 | -2 | 155 | 2 | 71 | 502 | 2 | 380 | -2 | 284 | 0 |
| 12 | 158 | 2 | 107 | -2 | 158 | 2 | 72 | 508 | 2 | 388 | -2 | 290 | 0 |
| 13 | 177 | 2 | 110 | -2 | 177 | 2 | 73 | 529 | 2 | 393 | -2 | 293 | 0 |
| 14 | 179 | 2 | 114 | -2 | 179 | 2 | 74 | 531 | 2 | 395 | -2 | 295 | 0 |
| 15 | 182 | 2 | 117 | -2 | 182 | 2 | 75 | 534 | 2 | 398 | -2 | 298 | 0 |
| 16 | 188 | 2 | 119 | -2 | 188 | 2 | 76 | 540 | 2 | 402 | -2 | 301 | 0 |
| 17 | 225 | 2 | 122 | -2 | 225 | 2 | 77 | 546 | 2 | 405 | -2 | 303 | 0 |
| 18 | 227 | 2 | 125 | -2 | 227 | 2 | 78 | 549 | 2 | 407 | -2 | 308 | 0 |
| 19 | 230 | 2 | 127 | -2 | 230 | 2 | 79 | 551 | 2 | 410 | -2 | 313 | 0 |
| 20 | 236 | 2 | 145 | -2 | 66 | 0 | 80 | 554 | 2 | 413 | -2 | 315 | 0 |
| 21 | 260 | 2 | 147 | -2 | 69 | 0 | 81 | 557 | 2 | 415 | -2 | 318 | 0 |
| 22 | 265 | 2 | 150 | -2 | 71 | 0 | 82 | 559 | 2 | 420 | -2 | 324 | 0 |
| 23 | 267 | 2 | 156 | -2 | 74 | 0 | 83 | 564 | 2 | 425 | -2 | 329 | 0 |
| 24 | 270 | 2 | 162 | -2 | 77 | 0 | 84 | 569 | 2 | 427 | -2 | 331 | 0 |
| 25 | 274 | 2 | 165 | -2 | 79 | 0 | 85 | 571 | 2 | 430 | -2 | 334 | 0 |
| 26 | 277 | 2 | 167 | -2 | 84 | 0 | 86 | 574 | 2 | 434 | -2 | 338 | 0 |
| 27 | 279 | 2 | 170 | -2 | 89 | 0 | 87 | 580 | 2 | 437 | -2 | 341 | 0 |
| 28 | 282 | 2 | 173 | -2 | 91 | 0 | 88 | 585 | 2 | 439 | -2 | 343 | 0 |
| 29 | 285 | 2 | 175 | -2 | 94 | 0 | 89 | 587 | 2 | 442 | -2 | 346 | 0 |
| 30 | 287 | 2 | 180 | -2 | 113 | 0 | 90 | 590 | 2 | 445 | -2 | 349 | 0 |
| 31 | 292 | 2 | 185 | -2 | 115 | 0 | 91 | 594 | 2 | 447 | -2 | 351 | 0 |
| 32 | 297 | 2 | 187 | -2 | 118 | 0 | 92 | 597 | 2 | 465 | -2 | 356 | 0 |
| 33 | 299 | 2 | 190 | -2 | 124 | 0 | 93 | 599 | 2 | 467 | -2 | 361 | 0 |
| 34 | 302 | 2 | 196 | -2 | 132 | 0 | 94 | 602 | 2 | 470 | -2 | 363 | 0 |
| 35 | 306 | 2 | 201 | -2 | 137 | 0 | 95 | 605 | 2 | 476 | -2 | 366 | 0 |
| 36 | 309 | 2 | 203 | -2 | 139 | 0 | 96 | 607 | 2 | 482 | -2 | 370 | 0 |
| 37 | 311 | 2 | 206 | -2 | 142 | 0 | 97 | 612 | 2 | 485 | -2 | 373 | 0 |
| 38 | 314 | 2 | 210 | -2 | 146 | 0 | 98 | 617 | 2 | 487 | -2 | 375 | 0 |
| 39 | 317 | 2 | 213 | -2 | 149 | 0 | 99 | 619 | 2 | 490 | -2 | 378 | 0 |
| 40 | 319 | 2 | 215 | -2 | 151 | 0 | 100 | 622 | 2 | 493 | -2 | 381 | 0 |
| 41 | 337 | 2 | 218 | -2 | 154 | 0 | 101 | 626 | 2 | 495 | -2 | 383 | 0 |
| 42 | 339 | 2 | 221 | -2 | 157 | 0 | 102 | 629 | 2 | 500 | -2 | 401 | 0 |
| 43 | 342 | 2 | 223 | -2 | 159 | 0 | 103 | 631 | 2 | 505 | -2 | 403 | 0 |
| 44 | 348 | 2 | 228 | -2 | 164 | 0 | 104 | 634 | 2 | 507 | -2 | 406 | 0 |
| 45 | 354 | 2 | 233 | -2 | 169 | 0 | 105 | 637 | 2 | 510 | -2 | 412 | 0 |
| 46 | 357 | 2 | 235 | -2 | 171 | 0 | 106 | 639 | 2 | 577 | -2 | 418 | 0 |
| 47 | 359 | 2 | 238 | -2 | 174 | 0 | 107 | 657 | 2 | 579 | -2 | 421 | 0 |
| 48 | 362 | 2 | 242 | -2 | 178 | 0 | 108 | 659 | 2 | 582 | -2 | 423 | 0 |
| 49 | 365 | 2 | 245 | -2 | 181 | 0 | 109 | 662 | 2 | 588 | -2 | 426 | 0 |
| 50 | 367 | 2 | 247 | -2 | 183 | 0 | 110 | 668 | 2 | 642 | -2 | 429 | 0 |
| 51 | 372 | 2 | 250 | -2 | 186 | 0 | 111 | 674 | 2 | 645 | -2 | 431 | 0 |
| 52 | 377 | 2 | 253 | -2 | 189 | 0 | 112 | 677 | 2 | 647 | -2 | 436 | 0 |
| 53 | 379 | 2 | 255 | -2 | 191 | 0 | 113 | 679 | 2 | 650 | -2 | 441 | 0 |
| 54 | 382 | 2 | 289 | -2 | 209 | 0 | 114 | 682 | 2 | 653 | -2 | 443 | 0 |
| 55 | 417 | 2 | 291 | -2 | 211 | 0 | 115 | 685 | 2 | 655 | -2 | 446 | 0 |
| 56 | 419 | 2 | 294 | -2 | 214 | 0 | 116 | 687 | 2 | 660 | -2 | 452 | 0 |
| 57 | 422 | 2 | 300 | -2 | 220 | 0 | 117 | 692 | 2 | 665 | -2 | 457 | 0 |
| 58 | 428 | 2 | 322 | -2 | 226 | 0 | 118 | 697 | 2 | 667 | -2 | 459 | 0 |
| 59 | 450 | 2 | 325 | -2 | 229 | 0 | 119 | 699 | 2 | 670 | -2 | 462 | 0 |
|  |  |  |  |  |  |  | 120 | 702 | 2 | 689 | -2 | 466 | 0 |

FIG. 2 (I)

| I | C1 | DS | C2 | DS | C3 | DS | I | C1 | DS | C2 | DS | C3 | DS |
|---|---|---|---|---|---|---|---|---|---|---|---|---|---|
| 121 | 708 | 2 | 691 | -2 | 469 | 0 | 191 | 1019 | 2 | 121 | -4 | 796 | 0 |
| 122 | 713 | 2 | 694 | -2 | 471 | 0 | 192 | 1022 | 2 | 123 | -4 | 802 | 0 |
| 123 | 715 | 2 | 700 | -2 | 474 | 0 | 193 | 134 | 4 | 126 | -4 | 805 | 0 |
| 124 | 718 | 2 | 737 | -2 | 477 | 0 | 194 | 266 | 4 | 161 | -4 | 807 | 0 |
| 125 | 722 | 2 | 739 | -2 | 479 | 0 | 195 | 269 | 4 | 163 | -4 | 810 | 0 |
| 126 | 725 | 2 | 742 | -2 | 484 | 0 | 196 | 271 | 4 | 166 | -4 | 813 | 0 |
| 127 | 727 | 2 | 748 | -2 | 489 | 0 | 197 | 281 | 4 | 172 | -4 | 815 | 0 |
| 128 | 730 | 2 | 772 | -2 | 491 | 0 | 198 | 283 | 4 | 194 | -4 | 820 | 0 |
| 129 | 733 | 2 | 777 | -2 | 494 | 0 | 199 | 286 | 4 | 197 | -4 | 825 | 0 |
| 130 | 735 | 2 | 779 | -2 | 498 | 0 | 200 | 305 | 4 | 199 | -4 | 827 | 0 |
| 131 | 740 | 2 | 782 | -2 | 501 | 0 | 201 | 307 | 4 | 202 | -4 | 830 | 0 |
| 132 | 745 | 2 | 786 | -2 | 503 | 0 | 202 | 310 | 4 | 205 | -4 | 836 | 0 |
| 133 | 747 | 2 | 789 | -2 | 506 | 0 | 203 | 353 | 4 | 207 | -4 | 841 | 0 |
| 134 | 750 | 2 | 791 | -2 | 509 | 0 | 204 | 355 | 4 | 212 | -4 | 843 | 0 |
| 135 | 754 | 2 | 794 | -2 | 511 | 0 | 205 | 358 | 4 | 217 | -4 | 846 | 0 |
| 136 | 757 | 2 | 797 | -2 | 545 | 0 | 206 | 451 | 4 | 219 | -4 | 850 | 0 |
| 137 | 759 | 2 | 799 | -2 | 547 | 0 | 207 | 454 | 4 | 222 | -4 | 853 | 0 |
| 138 | 762 | 2 | 804 | -2 | 550 | 0 | 208 | 530 | 4 | 241 | -4 | 855 | 0 |
| 139 | 765 | 2 | 809 | -2 | 556 | 0 | 209 | 533 | 4 | 243 | -4 | 858 | 0 |
| 140 | 767 | 2 | 811 | -2 | 578 | 0 | 210 | 535 | 4 | 246 | -4 | 861 | 0 |
| 141 | 801 | 2 | 814 | -2 | 581 | 0 | 211 | 538 | 4 | 252 | -4 | 863 | 0 |
| 142 | 803 | 2 | 818 | -2 | 583 | 0 | 212 | 541 | 4 | 321 | -4 | 868 | 0 |
| 143 | 806 | 2 | 821 | -2 | 586 | 0 | 213 | 543 | 4 | 323 | -4 | 873 | 0 |
| 144 | 812 | 2 | 823 | -2 | 589 | 0 | 214 | 553 | 4 | 326 | -4 | 875 | 0 |
| 145 | 834 | 2 | 826 | -2 | 591 | 0 | 215 | 555 | 4 | 332 | -4 | 878 | 0 |
| 146 | 837 | 2 | 829 | -2 | 596 | 0 | 216 | 558 | 4 | 386 | -4 | 882 | 0 |
| 147 | 839 | 2 | 831 | -2 | 601 | 0 | 217 | 562 | 4 | 389 | -4 | 885 | 0 |
| 148 | 842 | 2 | 849 | -2 | 603 | 0 | 218 | 565 | 4 | 391 | -4 | 887 | 0 |
| 149 | 845 | 2 | 851 | -2 | 606 | 0 | 219 | 567 | 4 | 394 | -4 | 890 | 0 |
| 150 | 847 | 2 | 854 | -2 | 625 | 0 | 220 | 570 | 4 | 397 | -4 | 893 | 0 |
| 151 | 852 | 2 | 860 | -2 | 627 | 0 | 221 | 573 | 4 | 399 | -4 | 895 | 0 |
| 152 | 857 | 2 | 866 | -2 | 630 | 0 | 222 | 575 | 4 | 404 | -4 | 913 | 0 |
| 153 | 859 | 2 | 869 | -2 | 636 | 0 | 223 | 593 | 4 | 409 | -4 | 915 | 0 |
| 154 | 862 | 2 | 871 | -2 | 644 | 0 | 224 | 595 | 4 | 411 | -4 | 918 | 0 |
| 155 | 881 | 2 | 874 | -2 | 649 | 0 | 225 | 598 | 4 | 414 | -4 | 924 | 0 |
| 156 | 883 | 2 | 877 | -2 | 651 | 0 | 226 | 610 | 4 | 433 | -4 | 930 | 0 |
| 157 | 886 | 2 | 879 | -2 | 654 | 0 | 227 | 613 | 4 | 435 | -4 | 933 | 0 |
| 158 | 892 | 2 | 884 | -2 | 658 | 0 | 228 | 615 | 4 | 438 | -4 | 935 | 0 |
| 159 | 900 | 2 | 889 | -2 | 661 | 0 | 229 | 618 | 4 | 444 | -4 | 938 | 0 |
| 160 | 905 | 2 | 891 | -2 | 663 | 0 | 230 | 621 | 4 | 481 | -4 | 941 | 0 |
| 161 | 907 | 2 | 894 | -2 | 666 | 0 | 231 | 623 | 4 | 483 | -4 | 943 | 0 |
| 162 | 910 | 2 | 929 | -2 | 669 | 0 | 232 | 633 | 4 | 486 | -4 | 948 | 0 |
| 163 | 914 | 2 | 931 | -2 | 671 | 0 | 233 | 635 | 4 | 492 | -4 | 953 | 0 |
| 164 | 917 | 2 | 934 | -2 | 676 | 0 | 234 | 638 | 4 | 643 | -4 | 955 | 0 |
| 165 | 919 | 2 | 940 | -2 | 681 | 0 | 235 | 673 | 4 | 646 | -4 | 958 | 0 |
| 166 | 922 | 2 | 962 | -2 | 683 | 0 | 236 | 675 | 4 | 652 | -4 | 964 | 0 |
| 167 | 925 | 2 | 965 | -2 | 686 | 0 | 237 | 678 | 4 | 773 | -4 | 969 | 0 |
| 168 | 927 | 2 | 967 | -2 | 690 | 0 | 238 | 706 | 4 | 775 | -4 | 971 | 0 |
| 169 | 932 | 2 | 970 | -2 | 693 | 0 | 239 | 709 | 4 | 778 | -4 | 974 | 0 |
| 170 | 937 | 2 | 973 | -2 | 695 | 0 | 240 | 711 | 4 | 781 | -4 | 978 | 0 |
| 171 | 939 | 2 | 975 | -2 | 698 | 0 | 241 | 714 | 4 | 783 | -4 | 981 | 0 |
| 172 | 942 | 2 | 980 | -2 | 701 | 0 | 242 | 717 | 4 | 788 | -4 | 983 | 0 |
| 173 | 946 | 2 | 985 | -2 | 703 | 0 | 243 | 719 | 4 | 793 | -4 | 986 | 0 |
| 174 | 949 | 2 | 987 | -2 | 721 | 0 | 244 | 729 | 4 | 795 | -4 | 989 | 0 |
| 175 | 951 | 2 | 990 | -2 | 723 | 0 | 245 | 731 | 4 | 798 | -4 | 991 | 0 |
| 176 | 954 | 2 | 1009 | -2 | 726 | 0 | 246 | 734 | 4 | 817 | -4 | 996 | 0 |
| 177 | 957 | 2 | 1011 | -2 | 732 | 0 | 247 | 753 | 4 | 819 | -4 | 1001 | 0 |
| 178 | 959 | 2 | 1014 | -2 | 738 | 0 | 248 | 755 | 4 | 822 | -4 | 1003 | 0 |
| 179 | 977 | 2 | 1020 | -2 | 741 | 0 | 249 | 758 | 4 | 828 | -4 | 1006 | 0 |
| 180 | 979 | 2 | 81 | -4 | 743 | 0 | 250 | 835 | 4 | 865 | -4 | 1010 | 0 |
| 181 | 982 | 2 | 83 | -4 | 746 | 0 | 251 | 838 | 4 | 867 | -4 | 1013 | 0 |
| 182 | 988 | 2 | 86 | -4 | 749 | 0 | 252 | 901 | 4 | 870 | -4 | 1015 | 0 |
| 183 | 994 | 2 | 92 | -4 | 751 | 0 | 253 | 903 | 4 | 876 | -4 | 1018 | 0 |
| 184 | 997 | 2 | 98 | -4 | 756 | 0 | 254 | 906 | 4 | 961 | -4 | 1021 | 0 |
| 185 | 999 | 2 | 101 | -4 | 761 | 0 | 255 | 909 | 4 | 963 | -4 | 1023 | 0 |
| 186 | 1002 | 2 | 103 | -4 | 763 | 0 | | | | | | | |
| 187 | 1005 | 2 | 106 | -4 | 766 | 0 | | | | | | | |
| 188 | 1007 | 2 | 109 | -4 | 785 | 0 | | | | | | | |
| 189 | 1012 | 2 | 111 | -4 | 787 | 0 | | | | | | | |
| 190 | 1017 | 2 | 116 | -4 | 790 | 0 | | | | | | | |

FIG. 2 (II)

| INPUT | kW | DS 00 | 01 | 10 | 11 | INPUT | kW | DS 00 | 01 | 10 | 11 |
|---|---|---|---|---|---|---|---|---|---|---|---|
| 0 | 493 | 0 | 2 | -2 | 0 | 14 | 155 | 0 | 2 | -2 | 0 |
|   | 363 | -2 | 0 | 0 | 2 |   | 187 | -2 | 0 | 0 | 2 |
|   | 427 | 2 | -4 | 4 | -2 |   | 370 | 2 | -4 | 4 | -2 |
| 1 | 695 | 0 | 2 | -2 | 0 | 15 | 159 | 0 | 2 | -2 | 0 |
|   | 367 | -2 | 0 | 0 | 2 |   | 191 | -2 | 0 | 0 | 2 |
|   | 431 | 2 | -4 | 4 | -2 |   | 378 | 2 | -4 | 4 | -2 |
| 2 | 699 | 0 | 2 | -2 | 0 | 16 | 185 | 0 | 2 | -2 | 0 |
|   | 491 | -2 | 0 | 0 | 2 |   | 217 | -2 | 0 | 0 | 2 |
|   | 941 | 2 | -4 | 4 | -2 |   | 393 | 2 | -4 | 4 | -2 |
| 3 | 703 | 0 | 2 | -2 | 0 | 17 | 189 | 0 | 2 | -2 | 0 |
|   | 495 | -2 | 0 | 0 | 2 |   | 221 | -2 | 0 | 0 | 2 |
|   | 295 | 2 | -4 | 4 | -2 |   | 397 | 2 | -4 | 4 | -2 |
| 4 | 733 | 0 | 2 | -2 | 0 | 18 | 211 | 0 | 2 | -2 | 0 |
|   | 701 | -2 | 0 | 0 | 2 |   | 243 | -2 | 0 | 0 | 2 |
|   | 299 | 2 | -4 | 4 | -2 |   | 419 | 2 | -4 | 4 | -2 |
| 5 | 759 | 0 | 2 | -2 | 0 | 19 | 215 | 0 | 2 | -2 | 0 |
|   | 727 | -2 | 0 | 0 | 2 |   | 247 | -2 | 0 | 0 | 2 |
|   | 303 | 2 | -4 | 4 | -2 |   | 438 | 2 | -4 | 4 | -2 |
| 6 | 763 | 0 | 2 | -2 | 0 | 20 | 219 | 0 | 2 | -2 | 0 |
|   | 731 | -2 | 0 | 0 | 2 |   | 251 | -2 | 0 | 0 | 2 |
|   | 423 | 2 | -4 | 4 | -2 |   | 446 | 2 | -4 | 4 | -2 |
| 7 | 767 | 0 | 2 | -2 | 0 | 21 | 223 | 0 | 2 | -2 | 0 |
|   | 735 | -2 | 0 | 0 | 2 |   | 255 | -2 | 0 | 0 | 2 |
|   | 805 | 2 | -4 | 4 | -2 |   | 498 | 2 | -4 | 4 | -2 |
| 8 | 875 | 0 | 2 | -2 | 0 | 22 | 249 | 0 | 2 | -2 | 0 |
|   | 765 | -2 | 0 | 0 | 2 |   | 329 | -2 | 0 | 0 | 2 |
|   | 937 | 2 | -4 | 4 | -2 |   | 506 | 2 | -4 | 4 | -2 |
| 9 | 879 | 0 | 2 | -2 | 0 | 23 | 253 | 0 | 2 | -2 | 0 |
|   | 1005 | -2 | 0 | 0 | 2 |   | 333 | -2 | 0 | 0 | 2 |
|   | 226 | 2 | -4 | 4 | -2 |   | 714 | 2 | -4 | 4 | -2 |
| 10 | 1003 | 0 | 2 | -2 | 0 | 24 | 357 | 0 | 2 | -2 | 0 |
|   | 153 | -2 | 0 | 0 | 2 |   | 359 | -2 | 0 | 0 | 2 |
|   | 234 | 2 | -4 | 4 | -2 |   | 907 | 2 | -4 | 4 | -2 |
| 11 | 1007 | 0 | 2 | -2 | 0 | 25 | 459 | 0 | 2 | -2 | 0 |
|   | 157 | -2 | 0 | 0 | 2 |   | 457 | -2 | 0 | 0 | 2 |
|   | 291 | 2 | -4 | 4 | -2 |   | 911 | 2 | -4 | 4 | -2 |
| 12 | 147 | 0 | 2 | -2 | 0 | 26 | 463 | 0 | 2 | -2 | 0 |
|   | 179 | -2 | 0 | 0 | 2 |   | 461 | -2 | 0 | 0 | 2 |
|   | 310 | 2 | -4 | 4 | -2 |   | 918 | 2 | -4 | 4 | -2 |
| 13 | 151 | 0 | 2 | -2 | 0 | 27 | 489 | 0 | 2 | -2 | 0 |
|   | 183 | -2 | 0 | 0 | 2 |   | 487 | -2 | 0 | 0 | 2 |
|   | 318 | 2 | -4 | 4 | -2 |   | 926 | 2 | -4 | 4 | -2 |
|   |   |   |   |   |   | 28 | 601 | 0 | 2 | -2 | 0 |
|   |   |   |   |   |   |   | 629 | -2 | 0 | 0 | 2 |
|   |   |   |   |   |   |   | 978 | 2 | -4 | 4 | -2 |

FIG. 15 (I)

| INPUT | kW | DS 00 | 01 | 10 | 11 |
|---|---|---|---|---|---|
| 29 | 605 | 0 | 2 | -2 | 0 |
| | 659 | -2 | 0 | 0 | 2 |
| | 986 | 2 | -4 | 4 | -2 |
| 30 | 627 | 0 | 2 | -2 | 0 |
| | 663 | -2 | 0 | 0 | 2 |
| | 98 | 2 | -4 | 4 | -2 |
| 31 | 631 | 0 | 2 | -2 | 0 |
| | 667 | -2 | 0 | 0 | 2 |
| | 106 | 2 | -4 | 4 | -2 |
| 32 | 635 | 0 | 2 | -2 | 0 |
| | 671 | -2 | 0 | 0 | 2 |
| | 265 | 2 | -4 | 4 | -2 |
| 33 | 639 | 0 | 2 | -2 | 0 |
| | 697 | -2 | 0 | 0 | 2 |
| | 269 | 2 | -4 | 4 | -2 |
| 34 | 665 | 0 | 2 | -2 | 0 |
| | 723 | -2 | 0 | 0 | 2 |
| | 706 | 2 | -4 | 4 | -2 |
| 35 | 669 | 0 | 2 | -2 | 0 |
| | 761 | -2 | 0 | 0 | 2 |
| | 801 | 2 | -4 | 4 | -2 |
| 36 | 691 | 0 | 2 | -2 | 0 |
| | 869 | -2 | 0 | 0 | 2 |
| | 903 | 2 | -4 | 4 | -2 |
| 37 | 729 | 0 | 2 | -2 | 0 |
| | 971 | -2 | 0 | 0 | 2 |
| | 284 | 2 | -4 | 4 | -2 |
| 38 | 755 | 0 | 2 | -2 | 0 |
| | 975 | -2 | 0 | 0 | 2 |
| | 412 | 2 | -4 | 4 | -2 |
| 39 | 841 | 0 | 2 | -2 | 0 |
| | 1001 | -2 | 0 | 0 | 2 |
| | 820 | 2 | -4 | 4 | -2 |
| 40 | 845 | 0 | 2 | -2 | 0 |
| | 166 | -2 | 0 | 0 | 2 |
| | 899 | 2 | -4 | 4 | -2 |
| 41 | 871 | 0 | 2 | -2 | 0 |
| | 174 | -2 | 0 | 0 | 2 |
| | 956 | 2 | -4 | 4 | -2 |
| 42 | 969 | 0 | 2 | -2 | 0 |
| | 230 | -2 | 0 | 0 | 2 |
| | 72 | 2 | -4 | 4 | -2 |
| 43 | 973 | 0 | 2 | -2 | 0 |
| | 238 | -2 | 0 | 0 | 2 |
| | 200 | 2 | -4 | 4 | -2 |

| INPUT | kW | DS 00 | 01 | 10 | 11 |
|---|---|---|---|---|---|
| 44 | 999 | 0 | 2 | -2 | 0 |
| | 306 | -2 | 0 | 0 | 2 |
| | 344 | 2 | -4 | 4 | -2 |
| 45 | 142 | 0 | 2 | -2 | 0 |
| | 314 | -2 | 0 | 0 | 2 |
| | 472 | 2 | -4 | 4 | -2 |
| 46 | 198 | 0 | 2 | -2 | 0 |
| | 355 | -2 | 0 | 0 | 2 |
| | 744 | 2 | -4 | 4 | -2 |
| 47 | 206 | 0 | 2 | -2 | 0 |
| | 374 | -2 | 0 | 0 | 2 |
| | 1016 | 2 | -4 | 4 | -2 |
| 48 | 402 | 0 | 2 | -2 | 0 |
| | 382 | -2 | 0 | 0 | 2 |
| | 429 | 4 | -2 | 2 | -4 |
| 49 | 410 | 0 | 2 | -2 | 0 |
| | 434 | -2 | 0 | 0 | 2 |
| | 939 | 4 | -2 | 2 | -4 |
| 50 | 455 | 0 | 2 | -2 | 0 |
| | 442 | -2 | 0 | 0 | 2 |
| | 943 | 4 | -2 | 2 | -4 |
| 51 | 470 | 0 | 2 | -2 | 0 |
| | 483 | -2 | 0 | 0 | 2 |
| | 293 | 4 | -2 | 2 | -4 |
| 52 | 478 | 0 | 2 | -2 | 0 |
| | 502 | -2 | 0 | 0 | 2 |
| | 425 | 4 | -2 | 2 | -4 |
| 53 | 550 | 0 | 2 | -2 | 0 |
| | 510 | -2 | 0 | 0 | 2 |
| | 807 | 4 | -2 | 2 | -4 |
| 54 | 558 | 0 | 2 | -2 | 0 |
| | 561 | -2 | 0 | 0 | 2 |
| | 811 | 4 | -2 | 2 | -4 |
| 55 | 563 | 0 | 2 | -2 | 0 |
| | 565 | -2 | 0 | 0 | 2 |
| | 815 | 4 | -2 | 2 | -4 |
| 56 | 567 | 0 | 2 | -2 | 0 |
| | 625 | -2 | 0 | 0 | 2 |
| | 935 | 4 | -2 | 2 | -4 |
| 57 | 571 | 0 | 2 | -2 | 0 |
| | 654 | -2 | 0 | 0 | 2 |
| | 202 | 4 | -2 | 2 | -4 |
| 58 | 575 | 0 | 2 | -2 | 0 |
| | 710 | -2 | 0 | 0 | 2 |
| | 395 | 4 | -2 | 2 | -4 |

FIG. 15 (II)

| INPUT | kW | DS 00 | 01 | 10 | 11 | | INPUT | kW | DS 00 | 01 | 10 | 11 |
|---|---|---|---|---|---|---|---|---|---|---|---|---|
| 59 | 614 | 0 | 2 | -2 | 0 | | 74 | 1022 | 0 | 2 | -2 | 0 |
|  | 718 | -2 | 0 | 0 | 2 | |  | 865 | -2 | 0 | 0 | 2 |
|  | 399 | 4 | -2 | 2 | -4 | |  | 909 | 4 | -2 | 2 | -4 |
| 60 | 622 | 0 | 2 | -2 | 0 | | 75 | 113 | 0 | 2 | -2 | 0 |
|  | 914 | -2 | 0 | 0 | 2 | |  | 963 | -2 | 0 | 0 | 2 |
|  | 406 | 4 | -2 | 2 | -4 | |  | 931 | 4 | -2 | 2 | -4 |
| 61 | 678 | 0 | 2 | -2 | 0 | | 76 | 117 | 0 | 2 | -2 | 0 |
|  | 922 | -2 | 0 | 0 | 2 | |  | 76 | -2 | 0 | 0 | 2 |
|  | 414 | 4 | -2 | 2 | -4 | |  | 950 | 4 | -2 | 2 | -4 |
| 62 | 686 | 0 | 2 | -2 | 0 | | 77 | 134 | 0 | 2 | -2 | 0 |
|  | 967 | -2 | 0 | 0 | 2 | |  | 140 | -2 | 0 | 0 | 2 |
|  | 466 | 4 | -2 | 2 | -4 | |  | 958 | 4 | -2 | 2 | -4 |
| 63 | 742 | 0 | 2 | -2 | 0 | | 78 | 353 | 0 | 2 | -2 | 0 |
|  | 982 | -2 | 0 | 0 | 2 | |  | 204 | -2 | 0 | 0 | 2 |
|  | 474 | 4 | -2 | 2 | -4 | |  | 1010 | 4 | -2 | 2 | -4 |
| 64 | 750 | 0 | 2 | -2 | 0 | | 79 | 451 | 0 | 2 | -2 | 0 |
|  | 990 | -2 | 0 | 0 | 2 | |  | 348 | -2 | 0 | 0 | 2 |
|  | 610 | 4 | -2 | 2 | -4 | |  | 1018 | 4 | -2 | 2 | -4 |
| 65 | 818 | 0 | 2 | -2 | 0 | | 80 | 537 | 0 | 2 | -2 | 0 |
|  | 89 | -2 | 0 | 0 | 2 | |  | 476 | -2 | 0 | 0 | 2 |
|  | 618 | 4 | -2 | 2 | -4 | |  | 194 | 4 | -2 | 2 | -4 |
| 66 | 826 | 0 | 2 | -2 | 0 | | 81 | 541 | 0 | 2 | -2 | 0 |
|  | 93 | -2 | 0 | 0 | 2 | |  | 548 | -2 | 0 | 0 | 2 |
|  | 738 | 4 | -2 | 2 | -4 | |  | 289 | 4 | -2 | 2 | -4 |
| 67 | 867 | 0 | 2 | -2 | 0 | | 82 | 100 | 0 | 2 | -2 | 0 |
|  | 102 | -2 | 0 | 0 | 2 | |  | 612 | -2 | 0 | 0 | 2 |
|  | 746 | 4 | -2 | 2 | -4 | |  | 391 | 4 | -2 | 2 | -4 |
| 68 | 886 | 0 | 2 | -2 | 0 | | 83 | 172 | 0 | 2 | -2 | 0 |
|  | 110 | -2 | 0 | 0 | 2 | |  | 684 | -2 | 0 | 0 | 2 |
|  | 803 | 4 | -2 | 2 | -4 | |  | 777 | 4 | -2 | 2 | -4 |
| 69 | 894 | 0 | 2 | -2 | 0 | | 84 | 236 | 0 | 2 | -2 | 0 |
|  | 115 | -2 | 0 | 0 | 2 | |  | 748 | -2 | 0 | 0 | 2 |
|  | 822 | 4 | -2 | 2 | -4 | |  | 781 | 4 | -2 | 2 | -4 |
| 70 | 946 | 0 | 2 | -2 | 0 | | 85 | 372 | 0 | 2 | -2 | 0 |
|  | 119 | -2 | 0 | 0 | 2 | |  | 884 | -2 | 0 | 0 | 2 |
|  | 830 | 4 | -2 | 2 | -4 | |  | 308 | 4 | -2 | 2 | -4 |
| 71 | 954 | 0 | 2 | -2 | 0 | | 86 | 508 | 0 | 2 | -2 | 0 |
|  | 123 | -2 | 0 | 0 | 2 | |  | 1020 | -2 | 0 | 0 | 2 |
|  | 882 | 4 | -2 | 2 | -4 | |  | 387 | 4 | -2 | 2 | -4 |
| 72 | 995 | 0 | 2 | -2 | 0 | | 87 | 524 | 0 | 2 | -2 | 0 |
|  | 127 | -2 | 0 | 0 | 2 | |  | 38 | -2 | 0 | 0 | 2 |
|  | 890 | 4 | -2 | 2 | -4 | |  | 444 | 4 | -2 | 2 | -4 |
| 73 | 1014 | 0 | 2 | -2 | 0 | | 88 | 588 | 0 | 2 | -2 | 0 |
|  | 646 | -2 | 0 | 0 | 2 | |  | 46 | -2 | 0 | 0 | 2 |
|  | 905 | 4 | -2 | 2 | -4 | |  | 796 | 4 | -2 | 2 | -4 |

FIG. 15(III)

| INPUT | kW | DS 00 | 01 | 10 | 11 |
|---|---|---|---|---|---|
| 89 | 652 | 0 | 2 | -2 | 0 |
|  | 51 | -2 | 0 | 0 | 2 |
|  | 924 | 4 | -2 | 2 | -4 |
| 90 | 716 | 0 | 2 | -2 | 0 |
|  | 55 | -2 | 0 | 0 | 2 |
|  | 232 | 4 | -2 | 2 | -4 |
| 91 | 860 | 0 | 2 | -2 | 0 |
|  | 59 | -2 | 0 | 0 | 2 |
|  | 504 | 4 | -2 | 2 | -4 |
| 92 | 988 | 0 | 2 | -2 | 0 |
|  | 63 | -2 | 0 | 0 | 2 |
|  | 584 | 4 | -2 | 2 | -4 |
| 93 | 36 | 0 | 2 | -2 | 0 |
|  | 280 | -2 | 0 | 0 | 2 |
|  | 712 | 4 | -2 | 2 | -4 |
| 94 | 49 | 0 | 2 | -2 | 0 |
|  | 408 | -2 | 0 | 0 | 2 |
|  | 856 | 4 | -2 | 2 | -4 |
| 95 | 53 | 0 | 2 | -2 | 0 |
|  | 952 | -2 | 0 | 0 | 2 |
|  | 984 | 4 | -2 | 2 | -4 |
| 96 | 373 | 2 | 0 | 0 | -2 |
|  | 349 | 0 | -2 | 2 | 0 |
|  | 685 | -4 | 2 | -2 | 4 |
| 97 | 445 | 2 | 0 | 0 | -2 |
|  | 375 | 0 | -2 | 2 | 0 |
|  | 167 | -4 | 2 | -2 | 4 |
| 98 | 471 | 2 | 0 | 0 | -2 |
|  | 379 | 0 | -2 | 2 | 0 |
|  | 171 | -4 | 2 | -2 | 4 |
| 99 | 475 | 2 | 0 | 0 | -2 |
|  | 383 | 0 | -2 | 2 | 0 |
|  | 175 | -4 | 2 | -2 | 4 |
| 100 | 479 | 2 | 0 | 0 | -2 |
|  | 439 | 0 | -2 | 2 | 0 |
|  | 681 | -4 | 2 | -2 | 4 |
| 101 | 509 | 2 | 0 | 0 | -2 |
|  | 443 | 0 | -2 | 2 | 0 |
|  | 137 | -4 | 2 | -2 | 4 |
| 102 | 747 | 2 | 0 | 0 | -2 |
|  | 447 | 0 | -2 | 2 | 0 |
|  | 141 | -4 | 2 | -2 | 4 |
| 103 | 751 | 2 | 0 | 0 | -2 |
|  | 477 | 0 | -2 | 2 | 0 |
|  | 163 | -4 | 2 | -2 | 4 |
| 104 | 861 | 2 | 0 | 0 | -2 |
|  | 503 | 0 | -2 | 2 | 0 |
|  | 182 | -4 | 2 | -2 | 4 |
| 105 | 887 | 2 | 0 | 0 | -2 |
|  | 507 | 0 | -2 | 2 | 0 |
|  | 190 | -4 | 2 | -2 | 4 |
| 106 | 891 | 2 | 0 | 0 | -2 |
|  | 511 | 0 | -2 | 2 | 0 |
|  | 242 | -4 | 2 | -2 | 4 |
| 107 | 895 | 2 | 0 | 0 | -2 |
|  | 749 | 0 | -2 | 2 | 0 |
|  | 250 | -4 | 2 | -2 | 4 |
| 108 | 951 | 2 | 0 | 0 | -2 |
|  | 885 | 0 | -2 | 2 | 0 |
|  | 354 | -4 | 2 | -2 | 4 |
| 109 | 955 | 2 | 0 | 0 | -2 |
|  | 957 | 0 | -2 | 2 | 0 |
|  | 362 | -4 | 2 | -2 | 4 |
| 110 | 959 | 2 | 0 | 0 | -2 |
|  | 983 | 0 | -2 | 2 | 0 |
|  | 482 | -4 | 2 | -2 | 4 |
| 111 | 989 | 2 | 0 | 0 | -2 |
|  | 987 | 0 | -2 | 2 | 0 |
|  | 490 | -4 | 2 | -2 | 4 |
| 112 | 1015 | 2 | 0 | 0 | -2 |
|  | 991 | 0 | -2 | 2 | 0 |
|  | 549 | -4 | 2 | -2 | 4 |
| 113 | 1019 | 2 | 0 | 0 | -2 |
|  | 1021 | 0 | -2 | 2 | 0 |
|  | 651 | -4 | 2 | -2 | 4 |
| 114 | 1023 | 2 | 0 | 0 | -2 |
|  | 201 | 0 | -2 | 2 | 0 |
|  | 655 | -4 | 2 | -2 | 4 |
| 115 | 203 | 2 | 0 | 0 | -2 |
|  | 205 | 0 | -2 | 2 | 0 |
|  | 662 | -4 | 2 | -2 | 4 |
| 116 | 207 | 2 | 0 | 0 | -2 |
|  | 231 | 0 | -2 | 2 | 0 |
|  | 670 | -4 | 2 | -2 | 4 |
| 117 | 233 | 2 | 0 | 0 | -2 |
|  | 235 | 0 | -2 | 2 | 0 |
|  | 722 | -4 | 2 | -2 | 4 |
| 118 | 237 | 2 | 0 | 0 | -2 |
|  | 239 | 0 | -2 | 2 | 0 |
|  | 730 | -4 | 2 | -2 | 4 |
| 119 | 309 | 2 | 0 | 0 | -2 |
|  | 307 | 0 | -2 | 2 | 0 |
|  | 970 | -4 | 2 | -2 | 4 |
| 120 | 403 | 2 | 0 | 0 | -2 |
|  | 311 | 0 | -2 | 2 | 0 |
|  | 114 | -4 | 2 | -2 | 4 |

FIG. 15 (IV)

| INPUT | kW | DS 00 | 01 | 10 | 11 |
|---|---|---|---|---|---|
| 121 | 407 | 2 | 0 | 0 | -2 |
|  | 315 | 0 | -2 | 2 | 0 |
|  | 122 | -4 | 2 | -2 | 4 |
| 122 | 411 | 2 | 0 | 0 | -2 |
|  | 319 | 0 | -2 | 2 | 0 |
|  | 545 | -4 | 2 | -2 | 4 |
| 123 | 415 | 2 | 0 | 0 | -2 |
|  | 345 | 0 | -2 | 2 | 0 |
|  | 647 | -4 | 2 | -2 | 4 |
| 124 | 441 | 2 | 0 | 0 | -2 |
|  | 371 | 0 | -2 | 2 | 0 |
|  | 962 | -4 | 2 | -2 | 4 |
| 125 | 467 | 2 | 0 | 0 | -2 |
|  | 409 | 0 | -2 | 2 | 0 |
|  | 156 | -4 | 2 | -2 | 4 |
| 126 | 505 | 2 | 0 | 0 | -2 |
|  | 413 | 0 | -2 | 2 | 0 |
|  | 564 | -4 | 2 | -2 | 4 |
| 127 | 585 | 2 | 0 | 0 | -2 |
|  | 435 | 0 | -2 | 2 | 0 |
|  | 643 | -4 | 2 | -2 | 4 |
| 128 | 589 | 2 | 0 | 0 | -2 |
|  | 473 | 0 | -2 | 2 | 0 |
|  | 700 | -4 | 2 | -2 | 4 |
| 129 | 615 | 2 | 0 | 0 | -2 |
|  | 499 | 0 | -2 | 2 | 0 |
|  | 35 | -4 | 2 | -2 | 4 |
| 130 | 619 | 2 | 0 | 0 | -2 |
|  | 613 | 0 | -2 | 2 | 0 |
|  | 39 | -4 | 2 | -2 | 4 |
| 131 | 623 | 2 | 0 | 0 | -2 |
|  | 715 | 0 | -2 | 2 | 0 |
|  | 43 | -4 | 2 | -2 | 4 |
| 132 | 713 | 2 | 0 | 0 | -2 |
|  | 719 | 0 | -2 | 2 | 0 |
|  | 47 | -4 | 2 | -2 | 4 |
| 133 | 717 | 2 | 0 | 0 | -2 |
|  | 745 | 0 | -2 | 2 | 0 |
|  | 54 | -4 | 2 | -2 | 4 |
| 134 | 743 | 2 | 0 | 0 | -2 |
|  | 821 | 0 | -2 | 2 | 0 |
|  | 62 | -4 | 2 | -2 | 4 |
| 135 | 819 | 2 | 0 | 0 | -2 |
|  | 915 | 0 | -2 | 2 | 0 |
|  | 88 | -4 | 2 | -2 | 4 |
| 136 | 823 | 2 | 0 | 0 | -2 |
|  | 919 | 0 | -2 | 2 | 0 |
|  | 216 | -4 | 2 | -2 | 4 |
| 137 | 827 | 2 | 0 | 0 | -2 |
|  | 923 | 0 | -2 | 2 | 0 |
|  | 328 | -4 | 2 | -2 | 4 |
| 138 | 831 | 2 | 0 | 0 | -2 |
|  | 927 | 0 | -2 | 2 | 0 |
|  | 456 | -4 | 2 | -2 | 4 |
| 139 | 857 | 2 | 0 | 0 | -2 |
|  | 953 | 0 | -2 | 2 | 0 |
|  | 760 | -4 | 2 | -2 | 4 |
| 140 | 883 | 2 | 0 | 0 | -2 |
|  | 979 | 0 | -2 | 2 | 0 |
|  | 1000 | -4 | 2 | -2 | 4 |
| 141 | 921 | 2 | 0 | 0 | -2 |
|  | 1017 | 0 | -2 | 2 | 0 |
|  | 365 | -4 | -2 | 2 | 4 |
|  | 10 | -8 | 2 | -2 | 8 |
| 142 | 925 | 2 | 0 | 0 | -2 |
|  | 178 | 0 | -2 | 2 | 0 |
|  | 683 | -2 | 4 | -4 | 2 |
| 143 | 947 | 2 | 0 | 0 | -2 |
|  | 186 | 0 | -2 | 2 | 0 |
|  | 687 | -2 | 4 | -4 | 2 |
| 144 | 985 | 2 | 0 | 0 | -2 |
|  | 227 | 0 | -2 | 2 | 0 |
|  | 169 | -2 | 4 | -4 | 2 |
| 145 | 1011 | 2 | 0 | 0 | -2 |
|  | 246 | 0 | -2 | 2 | 0 |
|  | 173 | -2 | 4 | -4 | 2 |
| 146 | 146 | 2 | 0 | 0 | -2 |
|  | 254 | 0 | -2 | 2 | 0 |
|  | 679 | -2 | 4 | -4 | 2 |
| 147 | 154 | 2 | 0 | 0 | -2 |
|  | 281 | 0 | -2 | 2 | 0 |
|  | 139 | -2 | 4 | -4 | 2 |
| 148 | 199 | 2 | 0 | 0 | -2 |
|  | 285 | 0 | -2 | 2 | 0 |
|  | 143 | -2 | 4 | -4 | 2 |
| 149 | 214 | 2 | 0 | 0 | -2 |
|  | 294 | 0 | -2 | 2 | 0 |
|  | 150 | -2 | 4 | -4 | 2 |
| 150 | 222 | 2 | 0 | 0 | -2 |
|  | 302 | 0 | -2 | 2 | 0 |
|  | 158 | -2 | 4 | -4 | 2 |

FIG. 15(V)

| INPUT | kW | DS 00 | DS 01 | DS 10 | DS 11 | | INPUT | kW | DS 00 | DS 01 | DS 10 | DS 11 |
|---|---|---|---|---|---|---|---|---|---|---|---|---|
| 151 | 305 | 2 | 0 | 0 | -2 | | 166 | 793 | 2 | 0 | 0 | -2 |
|  | 358 | 0 | -2 | 2 | 0 | |  | 974 | 0 | -2 | 2 | 0 |
|  | 210 | -2 | 4 | -4 | 2 | |  | 702 | -2 | 4 | -4 | 2 |
| 152 | 369 | 2 | 0 | 0 | -2 | | 167 | 797 | 2 | 0 | 0 | -2 |
|  | 366 | 0 | -2 | 2 | 0 | |  | 73 | 0 | -2 | 2 | 0 |
|  | 218 | -2 | 4 | -4 | 2 | |  | 754 | -2 | 4 | -4 | 2 |
| 153 | 398 | 2 | 0 | 0 | -2 | | 168 | 806 | 2 | 0 | 0 | -2 |
|  | 422 | 0 | -2 | 2 | 0 | |  | 77 | 0 | -2 | 2 | 0 |
|  | 458 | -2 | 4 | -4 | 2 | |  | 762 | -2 | 4 | -4 | 2 |
| 154 | 454 | 2 | 0 | 0 | -2 | | 169 | 814 | 2 | 0 | 0 | -2 |
|  | 430 | 0 | -2 | 2 | 0 | |  | 99 | 0 | -2 | 2 | 0 |
|  | 547 | -2 | 4 | -4 | 2 | |  | 866 | -2 | 4 | -4 | 2 |
| 155 | 462 | 2 | 0 | 0 | -2 | | 170 | 870 | 2 | 0 | 0 | -2 |
|  | 486 | 0 | -2 | 2 | 0 | |  | 103 | 0 | -2 | 2 | 0 |
|  | 551 | -2 | 4 | -4 | 2 | |  | 874 | -2 | 4 | -4 | 2 |
| 156 | 562 | 2 | 0 | 0 | -2 | | 171 | 878 | 2 | 0 | 0 | -2 |
|  | 494 | 0 | -2 | 2 | 0 | |  | 107 | 0 | -2 | 2 | 0 |
|  | 555 | -2 | 4 | -4 | 2 | |  | 994 | -2 | 4 | -4 | 2 |
| 157 | 570 | 2 | 0 | 0 | -2 | | 172 | 934 | 2 | 0 | 0 | -2 |
|  | 658 | 0 | -2 | 2 | 0 | |  | 111 | 0 | -2 | 2 | 0 |
|  | 559 | -2 | 4 | -4 | 2 | |  | 1002 | -2 | 4 | -4 | 2 |
| 158 | 611 | 2 | 0 | 0 | -2 | | 173 | 942 | 2 | 0 | 0 | -2 |
|  | 666 | 0 | -2 | 2 | 0 | |  | 118 | 0 | -2 | 2 | 0 |
|  | 566 | -2 | 4 | -4 | 2 | |  | 135 | -2 | 4 | -4 | 2 |
| 159 | 630 | 2 | 0 | 0 | -2 | | 174 | 998 | 2 | 0 | 0 | -2 |
|  | 711 | 0 | -2 | 2 | 0 | |  | 126 | 0 | -2 | 2 | 0 |
|  | 574 | -2 | 4 | -4 | 2 | |  | 450 | -2 | 4 | -4 | 2 |
| 160 | 638 | 2 | 0 | 0 | -2 | | 175 | 1006 | 2 | 0 | 0 | -2 |
|  | 726 | 0 | -2 | 2 | 0 | |  | 609 | 0 | -2 | 2 | 0 |
|  | 626 | -2 | 4 | -4 | 2 | |  | 131 | -2 | 4 | -4 | 2 |
| 161 | 690 | 2 | 0 | 0 | -2 | | 176 | 97 | 2 | 0 | 0 | -2 |
|  | 734 | 0 | -2 | 2 | 0 | |  | 707 | 0 | -2 | 2 | 0 |
|  | 634 | -2 | 4 | -4 | 2 | |  | 188 | -2 | 4 | -4 | 2 |
| 162 | 698 | 2 | 0 | 0 | -2 | | 177 | 101 | 2 | 0 | 0 | -2 |
|  | 817 | 0 | -2 | 2 | 0 | |  | 902 | 0 | -2 | 2 | 0 |
|  | 649 | -2 | 4 | -4 | 2 | |  | 521 | -2 | 4 | -4 | 2 |
| 163 | 739 | 2 | 0 | 0 | -2 | | 178 | 195 | 2 | 0 | 0 | -2 |
|  | 881 | 0 | -2 | 2 | 0 | |  | 92 | 0 | -2 | 2 | 0 |
|  | 653 | -2 | 4 | -4 | 2 | |  | 525 | -2 | 4 | -4 | 2 |
| 164 | 758 | 2 | 0 | 0 | -2 | | 179 | 390 | 2 | 0 | 0 | -2 |
|  | 910 | 0 | -2 | 2 | 0 | |  | 220 | 0 | -2 | 2 | 0 |
|  | 675 | -2 | 4 | -4 | 2 | |  | 540 | -2 | 4 | -4 | 2 |
| 165 | 766 | 2 | 0 | 0 | -2 | | 180 | 116 | 2 | 0 | 0 | -2 |
|  | 966 | 0 | -2 | 2 | 0 | |  | 268 | 0 | -2 | 2 | 0 |
|  | 694 | -2 | 4 | -4 | 2 | |  | 668 | -2 | 4 | -4 | 2 |

FIG. 15(VI)

FIG.15 (VII)

| INPUT | kW | DS 00 | 01 | 10 | 11 |
|---|---|---|---|---|---|
| 181 | 252 | 2 | 0 | 0 | -2 |
|  | 332 | 0 | -2 | 2 | 0 |
|  | 33 | -2 | 4 | -4 | 2 |
| 182 | 292 | 2 | 0 | 0 | -2 |
|  | 396 | 0 | -2 | 2 | 0 |
|  | 37 | -2 | 4 | -4 | 2 |
| 183 | 356 | 2 | 0 | 0 | -2 |
|  | 460 | 0 | -2 | 2 | 0 |
|  | 52 | -2 | 4 | -4 | 2 |
| 184 | 428 | 2 | 0 | 0 | -2 |
|  | 628 | 0 | -2 | 2 | 0 |
|  | 248 | -2 | 4 | -4 | 2 |
| 185 | 492 | 2 | 0 | 0 | -2 |
|  | 764 | 0 | -2 | 2 | 0 |
|  | 488 | -2 | 4 | -4 | 2 |
| 186 | 604 | 2 | 0 | 0 | -2 |
|  | 804 | 0 | -2 | 2 | 0 |
|  | 600 | -2 | 4 | -4 | 2 |
| 187 | 732 | 2 | 0 | 0 | -2 |
|  | 868 | 0 | -2 | 2 | 0 |
|  | 728 | -2 | 4 | -4 | 2 |
| 188 | 780 | 2 | 0 | 0 | -2 |
|  | 940 | 0 | -2 | 2 | 0 |
|  | 840 | -2 | 4 | -4 | 2 |
| 189 | 844 | 2 | 0 | 0 | -2 |
|  | 1004 | 0 | -2 | 2 | 0 |
|  | 968 | -2 | 4 | -4 | 2 |
| 190 | 469 | 4 | 2 | -2 | -4 |
|  | 725 | -4 | -2 | 2 | 4 |
|  | 50 | 0 | -2 | 2 | 0 |
| 191 | 855 | 4 | 2 | -2 | -4 |
|  | 181 | -4 | -2 | 2 | 4 |
|  | 58 | 0 | -2 | 2 | 0 |
| 192 | 859 | 4 | 2 | -2 | -4 |
|  | 245 | -4 | -2 | 2 | 4 |
|  | 152 | 0 | -2 | 2 | 0 |
| 193 | 863 | 4 | 2 | -2 | -4 |
|  | 331 | -4 | -2 | 2 | 4 |
|  | 696 | 0 | -2 | 2 | 0 |
| 194 | 893 | 4 | 2 | -2 | -4 |
|  | 335 | -4 | -2 | 2 | 4 |
|  | 440 | 0 | 2 | -2 | 0 |
| 195 | 949 | 4 | 2 | -2 | -4 |
|  | 361 | -4 | -2 | 2 | 4 |
|  | 792 | 0 | 2 | -2 | 0 |

| INPUT | kW | DS 00 | 01 | 10 | 11 |
|---|---|---|---|---|---|
| 196 | 1013 | 4 | 2 | -2 | -4 |
|  | 485 | -4 | -2 | 2 | 4 |
|  | 920 | 0 | 2 | -2 | 0 |
| 197 | 405 | 4 | 2 | -2 | -4 |
|  | 661 | -4 | -2 | 2 | 4 |
|  | 259 | 0 | -6 | 6 | 0 |
| 198 | 587 | 4 | 2 | -2 | -4 |
|  | 177 | -4 | -2 | 2 | 4 |
|  | 263 | 0 | -6 | 6 | 0 |
| 199 | 908 | 2 | 0 | 0 | -2 |
|  | 522 | -2 | 8 | -8 | 2 |
|  | 769 | 8 | 2 | -2 | -8 |
|  | 1 | -8 | -2 | 2 | 8 |
| 200 | 972 | 2 | 0 | 0 | -2 |
|  | 552 | -2 | 8 | -8 | 2 |
|  | 773 | 8 | 2 | -2 | -8 |
|  | 5 | -8 | -2 | 2 | 8 |
| 201 | 184 | 2 | 0 | 0 | -2 |
|  | 672 | -2 | 8 | -8 | 2 |
|  | 788 | 8 | 2 | -2 | -8 |
|  | 20 | -8 | -2 | 2 | 8 |
| 202 | 536 | 2 | 0 | 0 | -2 |
|  | 128 | -2 | 8 | -8 | 2 |
|  | 848 | 8 | 2 | -2 | -8 |
|  | 80 | -8 | -2 | 2 | 8 |
| 203 | 664 | 2 | 0 | 0 | -2 |
|  | 514 | -2 | 8 | -8 | 2 |
|  | 576 | 8 | 2 | -2 | -8 |
|  | 320 | -8 | -2 | 2 | 8 |
| 204 | 591 | 4 | 2 | -2 | -4 |
|  | 241 | -4 | -2 | 2 | 4 |
|  | 256 | 0 | -10 | 10 | 0 |
|  | 274 | -4 | -2 | 2 | 4 |
| 205 | 693 | 2 | 4 | -4 | -2 |
|  | 343 | -2 | -4 | 4 | 2 |
|  | 448 | 0 | 6 | -6 | 0 |
|  | 192 | 6 | 0 | 0 | -6 |
|  | 617 | 4 | 2 | -2 | -4 |
| 206 | 757 | 2 | 4 | -4 | -2 |
|  | 347 | -2 | -4 | 4 | 2 |
|  | 515 | 0 | 6 | -6 | 0 |
|  | 385 | 6 | 0 | 0 | -6 |
|  | 621 | 4 | 2 | -2 | -4 |
| 207 | 877 | 2 | 4 | -4 | -2 |
|  | 351 | -2 | -4 | 4 | 2 |
|  | 519 | 0 | 6 | -6 | 0 |
|  | 389 | 6 | 0 | 0 | -6 |
|  | 741 | 4 | 2 | -2 | -4 |

| INPUT | kW | DS 00 | 01 | 10 | 11 | | INPUT | kW | DS 00 | 01 | 10 | 11 |
|---|---|---|---|---|---|---|---|---|---|---|---|---|
| 208 | 149 | 2 | 4 | -4 | -2 | | 218 | 873 | 2 | 4 | -4 | -2 |
|  | 381 | -2 | -4 | 4 | 2 | |  | 275 | -2 | -4 | 4 | 2 |
|  | 523 | 0 | 6 | -6 | 0 | |  | 692 | 0 | 6 | -6 | 0 |
|  | 404 | 6 | 0 | 0 | -6 | |  | 828 | 6 | 0 | 0 | -6 |
|  | 825 | 4 | 2 | -2 | -4 | |  | 787 | 4 | 2 | -2 | -4 |
| 209 | 213 | 2 | 4 | -4 | -2 | | 219 | 997 | 2 | 4 | -4 | -2 |
|  | 437 | -2 | -4 | 4 | 2 | |  | 279 | -2 | -4 | 4 | 2 |
|  | 527 | 0 | 6 | -6 | 0 | |  | 752 | 0 | 6 | -6 | 0 |
|  | 464 | 6 | 0 | 0 | -6 | |  | 858 | 6 | 0 | 0 | -6 |
|  | 829 | 4 | 2 | -2 | -4 | |  | 791 | 4 | 2 | -2 | -4 |
| 210 | 595 | 2 | 4 | -4 | -2 | | 220 | 145 | 2 | 4 | -4 | -2 |
|  | 501 | -2 | -4 | 4 | 2 | |  | 283 | -2 | -4 | 4 | 2 |
|  | 542 | 0 | 6 | -6 | 0 | |  | 842 | 0 | 6 | -6 | 0 |
|  | 736 | 6 | 0 | 0 | -6 | |  | 888 | 6 | 0 | 0 | -6 |
|  | 851 | 4 | 2 | -2 | -4 | |  | 795 | 4 | 2 | -2 | -4 |
| 211 | 599 | 2 | 4 | -4 | -2 | | 221 | 209 | 2 | 4 | -4 | -2 |
|  | 981 | -2 | -4 | 4 | 2 | |  | 287 | -2 | -4 | 4 | 2 |
|  | 553 | 0 | 6 | -6 | 0 | |  | 872 | 0 | 6 | -6 | 0 |
|  | 771 | 6 | 0 | 0 | -6 | |  | 929 | 6 | 0 | 0 | -6 |
|  | 889 | 4 | 2 | -2 | -4 | |  | 799 | 4 | 2 | -2 | -4 |
| 212 | 603 | 2 | 4 | -4 | -2 | | 222 | 453 | 2 | 4 | -4 | -2 |
|  | 229 | -2 | -4 | 4 | 2 | |  | 326 | -2 | -4 | 4 | 2 |
|  | 557 | 0 | 6 | -6 | 0 | |  | 992 | 0 | 6 | -6 | 0 |
|  | 775 | 6 | 0 | 0 | -6 | |  | 933 | 6 | 0 | 0 | -6 |
|  | 197 | 4 | 2 | -2 | -4 | |  | 838 | 4 | 2 | -2 | -4 |
| 213 | 607 | 2 | 4 | -4 | -2 | | 223 | 569 | 2 | 4 | -4 | -2 |
|  | 313 | -2 | -4 | 4 | 2 | |  | 334 | -2 | -4 | 4 | 2 |
|  | 572 | 0 | 6 | -6 | 0 | |  | 129 | 0 | 6 | -6 | 0 |
|  | 779 | 6 | 0 | 0 | -6 | |  | 948 | 6 | 0 | 0 | -6 |
|  | 401 | 4 | 2 | -2 | -4 | |  | 846 | 4 | 2 | -2 | -4 |
| 214 | 633 | 2 | 4 | -4 | -2 | | 224 | 573 | 2 | 4 | -4 | -2 |
|  | 317 | -2 | -4 | 4 | 2 | |  | 433 | -2 | -4 | 4 | 2 |
|  | 602 | 0 | 6 | -6 | 0 | |  | 133 | 0 | 6 | -6 | 0 |
|  | 783 | 6 | 0 | 0 | -6 | |  | 1008 | 6 | 0 | 0 | -6 |
|  | 465 | 4 | 2 | -2 | -4 | |  | 945 | 4 | 2 | -2 | -4 |
| 215 | 637 | 2 | 4 | -4 | -2 | | 225 | 582 | 2 | 4 | -4 | -2 |
|  | 339 | -2 | -4 | 4 | 2 | |  | 497 | -2 | -4 | 4 | 2 |
|  | 632 | 0 | 6 | -6 | 0 | |  | 148 | 0 | 6 | -6 | 0 |
|  | 798 | 6 | 0 | 0 | -6 | |  | 586 | 6 | 0 | 0 | -6 |
|  | 583 | 4 | 2 | -2 | -4 | |  | 1009 | 4 | 2 | -2 | -4 |
| 216 | 843 | 2 | 4 | -4 | -2 | | 226 | 590 | 2 | 4 | -4 | -2 |
|  | 377 | -2 | -4 | 4 | 2 | |  | 709 | -2 | -4 | 4 | 2 |
|  | 673 | 0 | 6 | -6 | 0 | |  | 208 | 0 | 6 | -6 | 0 |
|  | 809 | 6 | 0 | 0 | -6 | |  | 616 | 6 | 0 | 0 | -6 |
|  | 598 | 4 | 2 | -2 | -4 | |  | 530 | 4 | 2 | -2 | -4 |
| 217 | 847 | 2 | 4 | -4 | -2 | | 227 | 689 | 2 | 4 | -4 | -2 |
|  | 917 | -2 | -4 | 4 | 2 | |  | 913 | -2 | -4 | 4 | 2 |
|  | 677 | 0 | 6 | -6 | 0 | |  | 534 | 0 | 6 | -6 | 0 |
|  | 813 | 6 | 0 | 0 | -6 | |  | 578 | 6 | 0 | 0 | -6 |
|  | 606 | 4 | 2 | -2 | -4 | |  | 538 | 4 | 2 | -2 | -4 |

FIG. 15 (VIII)

| INPUT | kW | DS 00 | 01 | 10 | 11 | | INPUT | kW | DS 00 | 01 | 10 | 11 |
|---|---|---|---|---|---|---|---|---|---|---|---|---|
| 228 | 753 | 2 | 4 | -4 | -2 | | 238 | 835 | 2 | 4 | -4 | -2 |
|  | 977 | -2 | -4 | 4 | 2 | |  | 270 | -2 | -4 | 4 | 2 |
|  | 594 | 0 | 6 | -6 | 0 | |  | 417 | 0 | -6 | 6 | 0 |
|  | 790 | 6 | 0 | 0 | -6 | |  | 90 | -6 | 0 | 0 | 6 |
|  | 579 | 4 | 2 | -2 | -4 | |  | 78 | -4 | -2 | 2 | 4 |
| 229 | 786 | 2 | 4 | -4 | -2 | | 239 | 993 | 2 | 4 | -4 | -2 |
|  | 67 | -2 | -4 | 4 | 2 | |  | 124 | -2 | -4 | 4 | 2 |
|  | 834 | 0 | 6 | -6 | 0 | |  | 421 | 0 | -6 | 6 | 0 |
|  | 850 | 6 | 0 | 0 | -6 | |  | 120 | -6 | 0 | 0 | 6 |
|  | 737 | 4 | 2 | -2 | -4 | |  | 83 | -4 | -2 | 2 | 4 |
| 230 | 794 | 2 | 4 | -4 | -2 | | 240 | 132 | 2 | 4 | -4 | -2 |
|  | 71 | -2 | -4 | 4 | 2 | |  | 244 | -2 | -4 | 4 | 2 |
|  | 267 | 0 | -6 | 6 | 0 | |  | 436 | 0 | -6 | 6 | 0 |
|  | 3 | -6 | 0 | 0 | 6 | |  | 161 | -6 | 0 | 0 | 6 |
|  | 282 | -4 | -2 | 2 | 4 | |  | 87 | -4 | -2 | 2 | 4 |
| 231 | 839 | 2 | 4 | -4 | -2 | | 241 | 196 | 2 | 4 | -4 | -2 |
|  | 75 | -2 | -4 | 4 | 2 | |  | 262 | -2 | -4 | 4 | 2 |
|  | 271 | 0 | -6 | 6 | 0 | |  | 496 | 0 | -6 | 6 | 0 |
|  | 7 | -6 | 0 | 0 | 6 | |  | 165 | -6 | 0 | 0 | 6 |
|  | 327 | -4 | -2 | 2 | 4 | |  | 91 | -4 | -2 | 2 | 4 |
| 232 | 854 | 2 | 4 | -4 | -2 | | 242 | 449 | 2 | 4 | -4 | -2 |
|  | 79 | -2 | -4 | 4 | 2 | |  | 300 | -2 | -4 | 4 | 2 |
|  | 286 | 0 | -6 | 6 | 0 | |  | 704 | 0 | -6 | 6 | 0 |
|  | 11 | -6 | 0 | 0 | 6 | |  | 180 | -6 | 0 | 0 | 6 |
|  | 342 | -4 | -2 | 2 | 4 | |  | 95 | -4 | -2 | 2 | 4 |
| 233 | 862 | 2 | 4 | -4 | -2 | | 243 | 468 | 2 | 4 | -4 | -2 |
|  | 86 | -2 | -4 | 4 | 2 | |  | 364 | -2 | -4 | 4 | 2 |
|  | 297 | 0 | -6 | 6 | 0 | |  | 897 | 0 | -6 | 6 | 0 |
|  | 15 | -6 | 0 | 0 | 6 | |  | 240 | -6 | 0 | 0 | 6 |
|  | 350 | -4 | -2 | 2 | 4 | |  | 121 | -4 | -2 | 2 | 4 |
| 234 | 531 | 2 | 4 | -4 | -2 | | 244 | 526 | 2 | 4 | -4 | -2 |
|  | 94 | -2 | -4 | 4 | 2 | |  | 420 | -2 | -4 | 4 | 2 |
|  | 301 | 0 | -6 | 6 | 0 | |  | 901 | 0 | -6 | 6 | 0 |
|  | 30 | -6 | 0 | 0 | 6 | |  | 330 | -6 | 0 | 0 | 6 |
|  | 657 | -4 | -2 | 2 | 4 | |  | 125 | -4 | -2 | 2 | 4 |
| 235 | 535 | 2 | 4 | -4 | -2 | | 245 | 556 | 2 | 4 | -4 | -2 |
|  | 105 | -2 | -4 | 4 | 2 | |  | 484 | -2 | -4 | 4 | 2 |
|  | 316 | 0 | -6 | 6 | 0 | |  | 916 | 0 | -6 | 6 | 0 |
|  | 41 | -6 | 0 | 0 | 6 | |  | 360 | -6 | 0 | 0 | 6 |
|  | 721 | -4 | -2 | 2 | 4 | |  | 323 | -4 | -2 | 2 | 4 |
| 236 | 539 | 2 | 4 | -4 | -2 | | 246 | 620 | 2 | 4 | -4 | -2 |
|  | 109 | -2 | -4 | 4 | 2 | |  | 705 | -2 | -4 | 4 | 2 |
|  | 346 | 0 | -6 | 6 | 0 | |  | 976 | 0 | -6 | 6 | 0 |
|  | 45 | -6 | 0 | 0 | 6 | |  | 480 | -6 | 0 | 0 | 6 |
|  | 965 | -4 | -2 | 2 | 4 | |  | 481 | -4 | -2 | 2 | 4 |
| 237 | 543 | 2 | 4 | -4 | -2 | | 247 | 676 | 2 | 4 | -4 | -2 |
|  | 225 | -2 | -4 | 4 | 2 | |  | 724 | -2 | -4 | 4 | 2 |
|  | 376 | 0 | -6 | 6 | 0 | |  | 224 | 0 | -6 | 6 | 0 |
|  | 60 | -6 | 0 | 0 | 6 | |  | 641 | -6 | 0 | 0 | 6 |
|  | 70 | -4 | -2 | 2 | 4 | |  | 108 | -4 | -2 | 2 | 4 |

FIG. 15 (IX)

|       |      | DS  |     |     |     |
|-------|------|-----|-----|-----|-----|
| INPUT | kW   | 00  | 01  | 10  | 11  |
| 248   | 740  | 2   | 4   | -4  | -2  |
|       | 900  | -2  | -4  | 4   | 2   |
|       | 278  | 0   | -6  | 6   | 0   |
|       | 645  | -6  | 0   | 0   | 6   |
|       | 164  | -4  | -2  | 2   | 4   |
| 249   | 892  | 2   | 4   | -4  | -2  |
|       | 964  | -2  | -4  | 4   | 2   |
|       | 338  | 0   | -6  | 6   | 0   |
|       | 660  | -6  | 0   | 0   | 6   |
|       | 228  | -4  | -2  | 2   | 4   |
| 250   | 1012 | 2   | 4   | -4  | -2  |
|       | 56   | -2  | -4  | 4   | 2   |
|       | 66   | 0   | -6  | 6   | 0   |
|       | 720  | -6  | 0   | 0   | 6   |
|       | 380  | -4  | -2  | 2   | 4   |
| 251   | 782  | 4   | 2   | -2  | -4  |
|       | 500  | -4  | -2  | 2   | 4   |
|       | 257  | -2  | -8  | 8   | 2   |
|       | 266  | 2   | -8  | 8   | -2  |
|       | 960  | -6  | 0   | 0   | 6   |
| 252   | 193  | 4   | 2   | -2  | -4  |
|       | 644  | -4  | -2  | 2   | 4   |
|       | 261  | -2  | -8  | 8   | 2   |
|       | 296  | 2   | -8  | 8   | -2  |
|       | 22   | -6  | 0   | 0   | 6   |
| 253   | 518  | 2   | 4   | -4  | -2  |
|       | 74   | 0   | -6  | 6   | 0   |
|       | 82   | -6  | 0   | 0   | 6   |
|       | 276  | -2  | -8  | 8   | 2   |
|       | 21   | -6  | -4  | 4   | 6   |
|       | 708  | -4  | -2  | 2   | 4   |
| 254   | 824  | 2   | 4   | -4  | -2  |
|       | 104  | 0   | -6  | 6   | 0   |
|       | 322  | -6  | 0   | 0   | 6   |
|       | 336  | -2  | -8  | 8   | 2   |
|       | 81   | -6  | -4  | 4   | 6   |
|       | 961  | -4  | -2  | 2   | 4   |
| 255   | 533  | 4   | 6   | -6  | -4  |
|       | 277  | -4  | -6  | 6   | 4   |
|       | 789  | 6   | 4   | -4  | -6  |
|       | 85   | -6  | -4  | 4   | 6   |
|       | 768  | 10  | 0   | 0   | -10 |
|       | 512  | 0   | 10  | -10 | 0   |

FIG. 15 (X)

APPARATUS FOR RECORDING A DIGITAL INFORMATION SIGNAL AND UTILIZING THE DIGITAL SUM VALUE THEREOF TO RECORD AN AUXILIARY DIGITAL SIGNAL, AND APPARATUS FOR REPRODUCING SUCH RECORDED SIGNALS

BACKGROUND OF THE INVENTION

1. Field of the Invention

The invention relates to an apparatus for recording a digital information signal in information tracks of a record carrier. Such apparatus is described inter alia in U.S. Pat. No. 4,511,933 (PHN 10.443) and published European Patent Application No. 250,049 (PHN 11.790), both assigned to the present assignee.

2. Description of the Related Art

Said U.S. Patent describes apparatus for recording a digital information signal in information tracks of a record carrier and, prior to recording, converting successive information words of such digital signal into channel words of a selected channel code. The selected channel code is such that that at least two channel words of mutually opposite disparity are available for each of a plurality of information words of the applied digital information signal. The apparatus comprises:
 an input terminal for receiving the information words,
 an encoding device having a first input coupled to the input terminal, a second input for receiving a control signal, and an output; which encoding device is adapted to select, depending on the applied information word and the control signal, a channel word from the channel words which are available for the applied information word and to supply the selected channel word to the output of the apparatus,
 a control-signal unit, having an output coupled to the second input of the encoding device and having an input for connection to a signal generator, and
 an output terminal coupled to the output of the encoding device to supply the channel words.

For inserting a second signal in the data stream of channel words, which second signal has a comparatively small low-frequency content relative to the recorded information signal, the control-signal unit is adapted to generate a control signal and the encoding device is adapted to make a choice from the channel words available for each information word depending on said control signal, in such a way that the average value of the recorded digital signal varies substantially in conformity with the variation of the second signal of comparatively low frequency. In this apparatus the second signal is a pilot signal comprising a carrier wave of comparatively low frequency relative to the recorded information signal, which pilot signal is intended to be recorded in the information tracks on the record carrier as a tracking signal to provide information about the relative position of a read element with respect to the information track to be scanned, i.e. the position in a direction transverse to the track direction. When a specific information track is read by the read element the comparatively low frequency of the tracking signals (varying d.c. content) gives rise to comparatively strong crosstalk of the tracking signals recorded in the two adjacent information tracks. Since the magnitude of the crosstalk between these two adjacent information tracks and the read element depends on the positioning of the read element relative to the information track to be read, it is possible to derive from the magnitude of the crosstalk signals a control signal which is representative of the position of the read element relative to the information track to be read. This control signal can then be used for controlling the position of the read element relative to the information track to be read.

It is to be noted that it is known per se to use tracking signals of comparatively low frequency for the purpose of controlling the position of a read element relative to the information tracks. Examples of the use of such tracking signals to record and read a video signal on a magnetic record-carrier tape can be found in U.S. Pat. Nos. 4,056,832; 4,110,799; and 4,297,733, all assigned to the present assignee. However, in all these systems the tracking signal to be recorded is an additional signal which is added to the information signal to be recorded.

In contradiction to this, the apparatus of the above-described U.S. Pat. No. 4,511,933 does not add an additional tracking signal to the digital signal to be recorded, but instead the coding is adapted in such a way that the digital sum value of the recorded digital signal is representative of the tracking signal. However, the recorded signal remains a fully digital signal, i.e. a purely binary signal when a binary code is used and a purely ternary signal in the case of a ternary code.

The known apparatus preferably converts information words of five data bits into channel words of seven data bits. The conversion of information words into channel words is effected in such a way that for one information word two channel words of equal but opposite disparity, for example ±2, are available.

The known apparatus has the disadvantage that the second signal is in the form of a pilot signal having only one amplitude and one waveform, namely a square waveform.

SUMMARY OF THE INVENTION

It is an object of the invention to provide a recording apparatus which enables a larger choice in amplitude and waveform of the second signal and a wider choice in respect of the coding to be obtained.

To this end the apparatus in accordance with the invention is characterized in that the channel code is selected in such a way that at least three channel words of mutually different disparity are available for each of at least a plurality of information words of the applied digital information signal, and the control-signal unit further comprises an integrating element and a signal-combination unit. The encoding device has a second output for supplying the disparity of a channel word applied to the first-mentioned output, which second output is coupled to an input of the integrating element, which has an output coupled to a first input of the signal-combination unit. The input of the control-signal unit is coupled to a second input of the signal-combination unit, which has an output coupled to the output of the control-signal unit.

The invention is based on recognition of the fact that in the conversion of information words into channel words a number of parameters play an important part.

First of all, there is the conversion factor. As already stated, this factor is preferably 5:7 in the known apparatus. Secondly, there is the parameter $T_{max}$, which indicates the maximum spacing (consecutive bits of the same binary value) between the edges corresponding to changes in bit values in the serialized bit stream.

A "five to seven" conversion has an efficiency of 71%, which is rather low. Therefore, a conversion with a higher efficiency is to be preferred. This means that longer words are needed. It is for example possible consider an "eight-to-ten" conversion, which has an efficiency of 80%. A specific value for $T_{max}$ may then be such that there are not enough pairs of ten-bit channel words of equal but opposite disparity for all the $2^8$ 8-bit information words.

This would mean that it is not readily possible to include the pilot signal in the information stream. Another possibility is to make $T_{max}$ larger. However, this has the disadvantage of a deterioration in clock characteristics during detection (during reproduction). Moreover, it leads to increased crosstalk between the actual information in adjacent tracks. It also leads to increased low-frequency noise in the tracking signal.

If in accordance with the invention other 10-bit words of a disparity besides ±2 are permissible as channel words, this will always enable a pilot signal to be inserted in the information stream of the channel words.

This step means in fact that for the conversion of at least a plurality information words now at least three channel words of mutually different disparity are available for each of these information words. Sometimes it will be adequate to have exactly three channel words per information word. If this is not possible a fourth channel word (or even more channel words) may be made available for each information word.

Which of the three or more channel words is to be chosen for an information word depends on the second signal to be included in the information stream of the channel words. This choice is such that the d.c. content of the information stream of the channel words varies in accordance with the desired pattern. If the second signal is in the form of a pilot signal this means that the d.c. content then varies in accordance with the desired carrier wave of a frequency which is comparatively low relative to the recorded information signal. Moreover, it is now possible to choose different waveforms and amplitudes for the second signal. The second signal may, for example, have a broader frequency spectrum than the pilot signal.

To ensure that the d.c. content is a close approximation to the second signal to be inserted, a control loop is needed. The integrating element derives the digital sum value or DSV of the information stream of the channel words from the disparities of the channel word supplied. In the signal-combination unit the digital sum value is compared with the desired digital sum value as dictated by the output signal of a signal generator connected to the signal input of the control-signal unit. This comparison yields the control signal which determines the choice from the three or more channel words available for an information word to be converted. A channel word of such a disparity is then selected that after integration the second signal inserted in the information stream of the channel words is a close approximation to the signal supplied by the signal generator.

The signal supplied by the signal generator may be a signal of a specific frequency, for example a triangular signal. The second signal is then a pilot signal of (substantially) rectangular waveform. As already stated, the pilot signal included in the information stream of the channel words may be used for tracking. In the case of a four-frequency DTF (dynamic track following) system one of four different tracking signals of four different frequencies must be recorded on a record carrier in every track in cycles of four consecutive tracks. This means that the signal generator must be constructed to generate a signal of the appropriate frequency for each of the four consecutive tracks to be recorded in cycles of four consecutive tracks each.

Instead of a pilot signal it is possible to insert another signal, for example additional (digital) information, in the information stream of the channel words. The signal generator should then apply signals corresponding to said other signal to the signal input of the control-signal unit. It is also possible to insert both the pilot signal and another signal in the information stream of the channel words. In that case the signal generator should also apply the appropriate signal to the signal input of the control-signal input.

The channel words may be stored in memories in the encoding device. The applied information word may can serve as an address for the three or more memories in which the three or more sets of channel words are stored. Three or more channel words then appear on the outputs of the memories. The encoding device then selects one of the channel words depending on the control signal. A memory, which consequently contains a set of channel words, one for each information word, then need not necessarily store channel words of the same disparity.

It is alternatively possible to provide only one memory, which stores only one set of auxiliary channel words, each having a number of bits which is at least two less than the number of the channel-word bits.

An information word may again be used for addressing the memory, so that an auxiliary channel word appears on the output of the memory. Now, the encoding device should in addition comprise means which, depending on the control signal, replenishes the number of missing bits of the auxiliary channel words to obtain the channel words. If the number of missing bits is two, there will be four possibilities of supplementing an auxiliary channel word to obtain a full channel word for encoding an information word into a channel word. These four possibilities then yield four channel words of three different disparities.

During reproduction the channel words should be decoded in a manner complementary to the method employed for encoding.

The invention also provides apparatus for reading a digital signal from information tracks of a magnetic carrier, which digital signal includes a pilot signal comprising a carrier wave of comparatively low frequency relative to the bit rate of the digital signal, which digital signal comprises consecutive channel words of a specific disparity such that the average value of the digital signal varies in conformity with the carrier wave. Such apparatus is constructed to convert, subsequent to reading, the consecutive channel words into information words. Such apparatus comprises:

read means for reading the digital signal from the information tracks on the record carrier, having an output coupled to an input of an integrating amplifier having an input coupled to the output of the read means, and a decoder unit coupled to the output of said amplifier and which decodes the channel words into information words which are supplied to an output terminal.

The apparatus is characterized in that the integrating amplifier has a frequency-response characteristic a first portion of which is of substantially constant value in a first frequency range and a second portion of and which rises with decreasing frequencies in a second frequency range above the first frequency range. Even if the frequency of the pilot signal is situated in the first frequency range, the integrating amplifier selectively amplifies the pilot signal in accordance with extrapolation of the second portion of said frequency response characteristic. Thus, it is possible to provide correction for the differentiating action of the read head, yet enabling the pilot signal to be read with a correct amplitude. The means for selectively amplifying the pilot signal may comprise a series arrangement of a narrow-band bandpass filter having a central frequency substantially corresponding to the frequency of the pilot signal and an amplifier, which series arrangement is arranged in parallel with the integrating amplifier. In order to correct for the phase shifts in the various filters the series arrangement may further include a phase shifter.

BRIEF DESCRIPTION OF THE DRAWINGS

Embodiments of the invention will now be described in more detail, by way of example, with reference to the accompanying drawings. In the drawings FIG. 15(I)–15(X) show a conversion table relating to an encoder unit comprising a 2T-precoder.

DESCRIPTION OF THE PREFERRED EMBODIMENTS

Figures 1, 3:
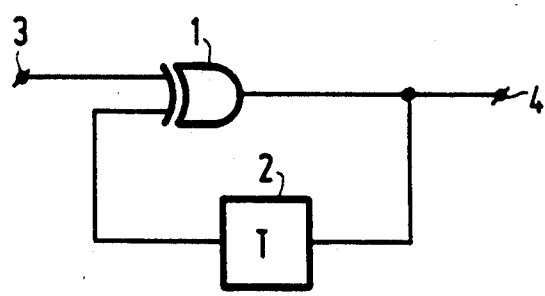
FIG. 1 shows diagrammatically a table having three columns with channel words FIG. 2 (I) shows a first half of the table of FIG. 1 completely, FIG. 2 (II) shows a second half of the table of FIG. 1 completely.
FIG. 3 shows a precoder suitable for use in the recording apparatus of the invention.

FIG. 1 shows diagrammatically a conversion table for converting 8-bit information words into 10-bit channel words. The complete conversion table is given in FIGS. 2(I) and 2(II). In the left-hand column I the conversion table of FIG. 1 gives the 256 ($=2^8$) information words, which are represented in decimal notation from 0 to 255. The table of FIG. 1 further has three columns C1, C2 and C3. For each information word I(i) each of the columns contains one channel word Cj(i), j=1, 2 or 3. Consequently, three channel words C1(i), C2(i) and C3(i) are available for each information word I(i). In the table shown in FIG. 2 the channel words are again given in decimal notation. The table of FIG. 1 only gives the disparity DS of the channel words.

The channel words in the column C1 corresponding to the information words 0 to 192 have a disparity of +2. The channel words in said column which correspond to the information words 193 to 255 have a disparity of +4. For the column C2 the channel words corresponding to the information words 0 to 179 have a disparity of −2, and the channel words corresponding to the information words 180 to 255 have a disparity of −4. In the column C3 the first 20 channel words have a disparity of +2 and the remaining channel words have a disparity of 0.

Of the 1024 ($=2^{10}$) 10-bit channel words, those complying with $T_{max}=6$ include 236 channel words having a disparity of 0, 194 channel words having a disparity of +2, 180 channel words having a disparity of −2, 97 channel words having a disparity of +4, and 78 channel words having a disparity of −4.

The table in FIG. 1 shows that exactly said 236 channel words having a disparity of 0 are used, that 193 of the 194 channel words of DS=2 are used (note that the first 20 channel words in the columns C1 and C3 are the same), that all the 180 channel words of DS=−2 are used, and that 76 of the 78 channel words of DS=−4 are used. $T_{max}=5$ for 63 channel words in C1 for which DS=4. This means that 785 channel words are available, of which 748 words are used.

It will be noted that only for the information words 20 to 255 there are three channel words of mutually different disparity available. For the information words 0 to 19 only two channel words of mutually opposite disparity are available.

The columns C1, C2 and C3 in FIG. 2 give the decimal numbers corresponding to the binary channel words which can be recorded on the record carrier. The numbers in the columns C1, C2 and C3 cannot be recorded directly on the record carrier as channel words. They must first be processed in a precoder, as shown in FIG. 3, before they can be recorded on the record carrier.

By way of example the conversion of the number of C1(1)=67 in the precoder is described. The precoder comprises an EXOR 1 and a delay means 2 having a delay time T of one bit cell. The input 3 of the precoder is coupled to one input of the EXOR 1. The output of the EXOR is coupled to the output 4 of the precoder and to the other input of the EXOR via the delay means 2. The 10-bit finary number corresponding to the decimal number 67 is 0001000011.

It is assumed that this number is serially applied to the input 3, the most significant bit first. It is also assumed that at the instant at which the most significant bit is applied the delay means 2 presents a "0" to the other input of the EXOR. The channel word appearing on the output is then the binary number 0001111101. This channel word has a disparity of +2.

The precoder is important if an NRZ-I recording is employed, which is costumary in magnetic recording. NRZ-I recording means that the "ones" of the data signal to be recorded are converted into changes in magnetization in the record carrier, so that the polarity of the channel is no longer relevant. Each pulse reproduced by a reproducing head now represents a "1", regardless of the polarity, whereas the absence of a pulse represents a "zero".

Figure 4:
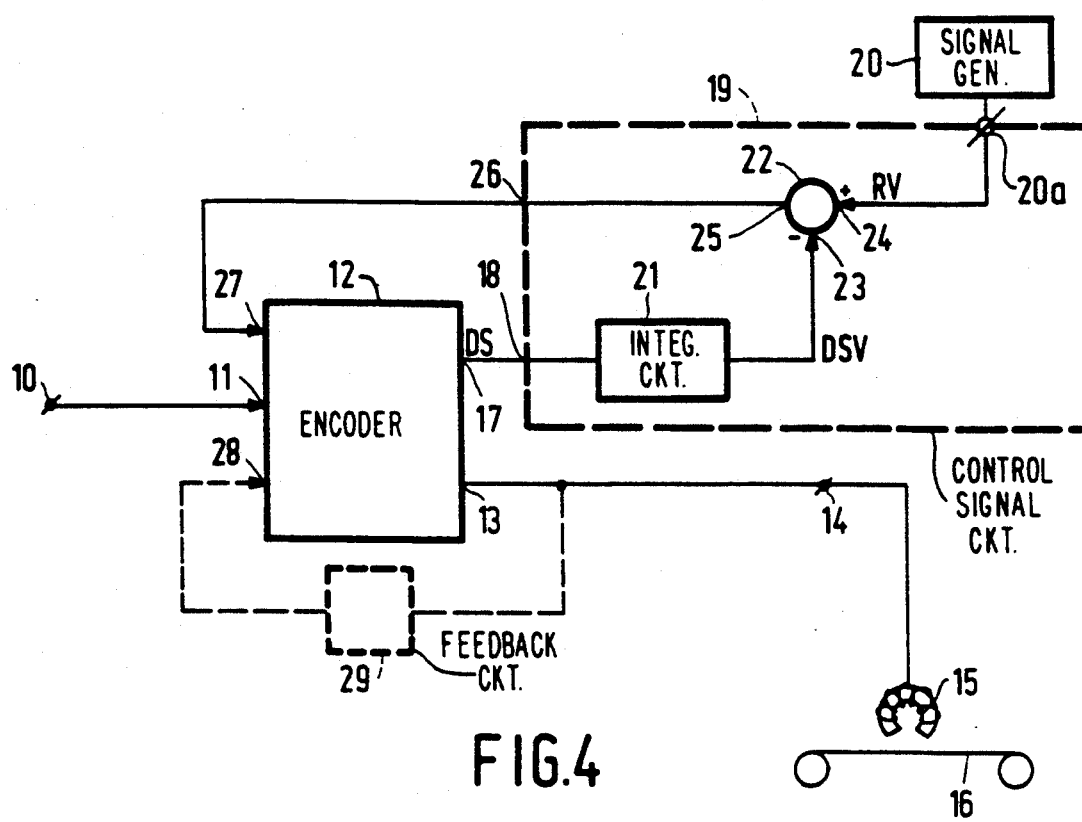
FIG. 4 is a block diagram of such apparatus for recording a digital information signal.

However, it is also possible to incorporate the precoder function directly in the encoding device, so that the encoding device, instead of using the numbers in the table of FIG. 2, directly supplies the channel words, as will become apparent from the description with reference to FIG. 4.

FIG. 4 shows in block form apparatus for recording a digital information signal. An input terminal 10 for receiving information words is coupled to a first input 11 of an encoding device 12. A first output 13 of the encoding device 12 is coupled to the output terminal 14 of the recording apparatus, to supply the channel words. Subsequently the channel words are applied to write means 15 to record the channel words in information tracks (not shown) on a magnetic record carrier 16. The write means 15 may comprise one or more write heads arranged on a rotatable head drum.

It is alternatively possible to record the channel words in other, non-magnetic record carriers. These may be, for example, optical record carriers.

A second output 17 of the encoding device 12 is coupled to an input 18 of a control signal unit 19. The control-signal unit 19 comprises an integrating element 21 and a signal-combination unit 22. The input 18 of the control-signal unit 19 is coupled to a first input 23 of the signal-combination unit 22 via the integrating element. A signal generator 20 is coupled to a signal input 20a of the control-signal unit 19. The input 20a is coupled to a second input 24 of the combination unit 22, which has an output 25 coupled to the output 26 of the control signal unit 19. The output 26 of the control signal unit 19 is coupled to a second input 27 of the encoding device 12.

The encoding device 12 determines channel words for the consecutive information words applied to the input 11, which channel words are applied to the output 13. This is effected as follows. The disparity DS of each channel word applied to the output 13 is determined and is applied to the output 17. The integrating element 21 determines the digital sum value (or DSV) of the information stream of channel words appearing on the output 13 by integrating the disparities of the channel words supplied consecutively by the encoding device.

The signal generator 20 supplies a signal RV the variation of which is to be represented by the digital sum value of the information stream of channel words.

Figure 5:
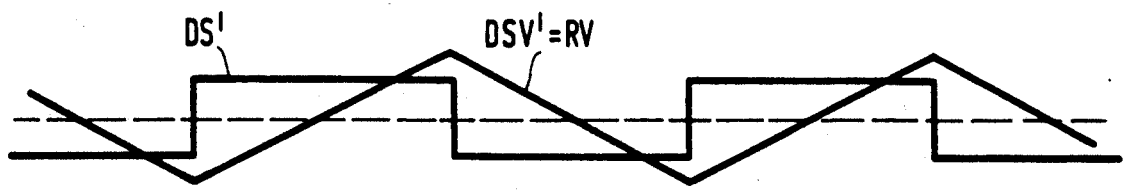
FIG. 5 shows two signal waveforms as a function of time.

In FIG. 5 the curve DS' indicates how the disparity of the channel words and hence the waveform of the second signal, in the present case having the form of a pilot signal, would have to be in the ideal case. In fact this curve corresponds to the curve u in FIG. 5 of the above-described U.S. Pat. No. 4,511,933. The pilot signal is a carrier wave of comparatively low frequency relative to the bit rate of the digital signal. The curve DSV' is derived from the curve DS' and represents the digital sum value obtained by integration of the curve DS'. This curve corresponds to the desired value RV as supplied by the signal generator 20.

The signal-combination unit 22 derives the control signal as the difference of the signals DSV and RV applied to its inputs 23 and 24, and applies it to the control-signal input 27 of the encoding unit 12 via the output 25 of unit 22.

Since for a number of information words no channel words of ideal disparity are available to the encoding unit 12, this means that it is necessary to deviate from the ideal curve DS' and hence from the ideal curve DSV' in FIG. 5. The encoding unit 12 now each time selects such a channel word that a close approximation of DSV to the ideal curve DSV'=RV is obtained. This means that the new channel word is selected from the three available channel words in such a way that the magnitude $$RV - DSV + DSN$$

is minimal. DSN is the disparity of the new channel word.

The encoding unit 12 may have the three sets of channel words stored in three different memories (not shown). In that case the information word applied via the input 11 may serve for addressing the three memories. The three channel words are then available on the outputs of the three memories. These outputs of the three memories are connected to a selection unit (not shown), which moreover receives the control signal RV−DSV and which selects the appropriate channel word from the three channel words.

Figure 6:
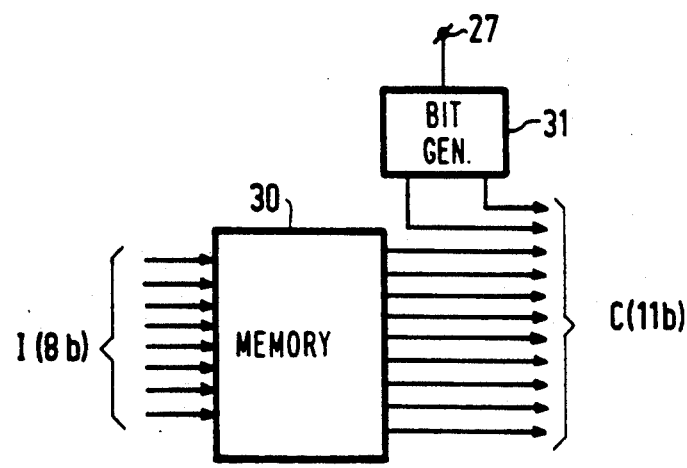
FIG. 6 shows an example of the encoder unit of the apparatus shown in FIG. 4.

Alternatively, the encoding unit may comprise, for example, only one memory 30, to which the 8-bit information word I is applied as the address, see FIG. 6. The memory supplies for example 9-bit words on its output. Depending on the control signal applied via the input 27, a bit generating unit 31 which forms part of the encoding unit 12 supplies two additional bits, yielding an 11-bit channel word. The values of the two additional bits are in fact determined by the control signal and provide the different disparities of the channel words available for one information word.

The apparatus shown in FIG. 4 further may have feedback from the output 13 to a third input 28 of the encoding unit 12. This feedback is necessary if an NRZ-I coding (non-return-to-zero inverse) is employed. Such a coding is costumary if the information is recorded on a magnetic record carrier. For this NRZ-I coding the afore-mentioned precoder shown in FIG. 3 is needed.

This means that if no NRZ-I coding is applied no precoder is needed. The tables then directly contain the channel words corresponding to the information words and no feedback of the last bit of the preceding channel word via the element 29 is provided.

If NRZ-I coding is applied feedback via the element 29 is necessary. How this feedback operates will be described hereinafter.

As already set forth in the description with reference to FIG. 3, the number 67 (=0001000011) is converted into 0001111101 by the precoder if the last bit of the preceding number is a "0". This channel word has a disparity of ±2. If the last bit of the preceding number is a "1", the precoder converts the number 67 into 1110000010 which is exactly the inverse of the first number. The disparity of this number is then precisely ±2. It is to be noted that the MSB is the first bit to be applied to the precoder.

If the control signal applied to the encoding unit 12 via the input 27 should select the channel word "67" from the table C1 because a channel word of +2 disparity is required, the precoder will ensure that in the case that the last bit of the preceding channel word is a "1", a channel word of −2 disparity is applied to the output 13, which is undesirable.

Under the influence of the feedback of the last bit to the input 28 via the element 29 the encoding unit 12 then makes a choice from another table, for example C2. The precoder now converts the number "68" (binary number 0001000100) of −2 disparity into the binary number 1110000111 having a disparity of +2 by the precoder if the last bit of the preceding channel word is a "1".

In the forgoing it is assumed that the precoder of FIG. 3 is arranged between that part of the encoding unit 12 which supplies the channel words from the tables C1, C2 and C3 in FIG. 2, and the output 13.

As already stated, the precoder function may also be incorporated directly in the tables. This means that for the information word 0 C1 will not be the number 67 (=0001000011) but the number 0001111101 (the last bit of the preceding channel word being "0"). It is also possible to provide a table $\overline{C1}$ which stores channel words which are inverted in comparison with the table C1. These channel words would be supplied by the precoder if the last bit of the preceding channel word is "1". It is also possible to obtain inverse channel words $\overline{C1}$ by inversion of the channel words C1.

Obviously, the same applies to the channel words in the tables C2 and C3. Thus, if the information word 0 is applied and the control signal indicates that a channel word of +2 disparity is required, while the feedback via the input 28 indicates that the last bit of the preceding word is a "1", the encoding unit 12 will select the channel word "1110000111" from the table $\overline{C2}$. If no separate table $\overline{C1}$, $\overline{C2}$, $\overline{C3}$ is available the encoding unit 12 will select the channel word 0001111000 from the table C2, which word is subsequently inverted.

Another example is given. Assume that one of the information words situated between the information words 180 and 192, see FIG. 1, is to be encoded and that a channel word of −4 disparity is the best word meeting with the requirement that RV−DSV+DSN should be minimal.

Moreover, assume that the last bit of the preceding channel word is found to be "1". This means that the encoding unit 12 should now make a selection from the three channel words of the tables $\overline{C1}$, $\overline{C2}$ and $\overline{C3}$ corresponding to the information word. The closest approximation in respect of the disparity is the channel word from $\overline{C1}$. This has a disparity of −2 and will therefore be selected by the encoding unit 12.

Thus, the precoder function is incorporated in the tables in the encoding unit 12, so that no separate precoder is needed.

Figure 7:
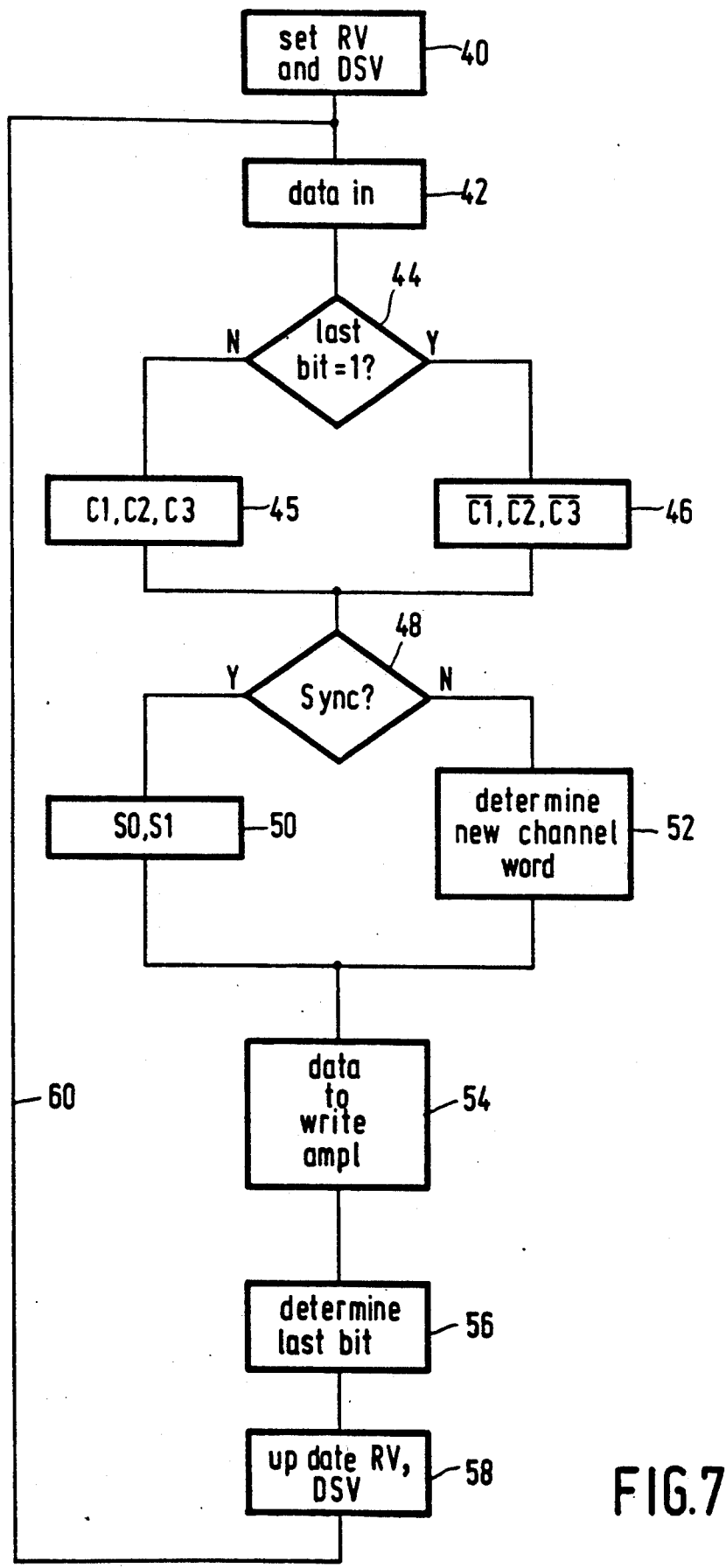
FIG. 7 is a flow chart illustrating the operation of the apparatus shown in FIG. 4.

FIG. 7 shows a flow chart to illustrate the operation of the apparatus shown in FIG. 4. The method starts in block 40 for a specific value of RV and DSV. Subsequently an information word is received (block 42). If this information word is not the first information word it is determined in block 44 whether the last bit of the channel word into which the preceding information word has been decoded was a "0" or a "1". Depending on the answer either three channel words from the sets C1, C2, C3 (block 45) or the inverse words of these three channel words (block 47) are selected. Here, it is assumed that the precoder function is incorporated in the channel words, so that no separate precoder is needed.

Subsequently it is ascertained in block 48 whether a sync word is to be inserted into the information stream to be encoded. If this is not the case the channel word for which RV−DSV−DSN is minimal is selected from the three available channel words in block 52, DSN being the disparity of the relevant channel word. The selected channel word is applied to the write amplifier in order to be recorded (block 54) and in addition the last bit of this channel word is determined (block 56), the new value for RV is determined and the new value for DSV is computed depending on the previous value for DSV and DSN (block 58), after which the program returns to block 42 via the line 60, in which block the next information word is read in.

Selection of the sync word in block 50 proceeds as follows. A 2 times 10-bit word $S_0$, $S_1$ is inserted into the data stream of channel words, in such a way that the shape of the pilot signal is maintained as far as possible. Suitably, viewed in time, an integral number of 10bit channel words can be accommodated in half a period of the signal RV. This has the advantage that a close approximation to the pilot signal is possible.

Figure 8:
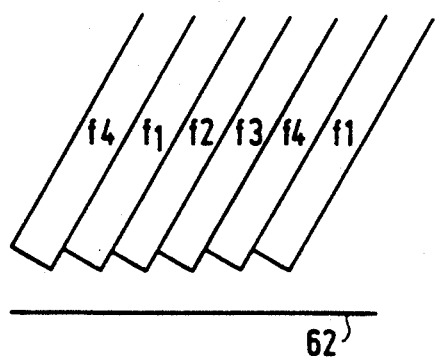
FIG. 8 shows the record carrier on which a number of tracks are indicated.

In a four-frequency DTF system, the pilot signal is in the form of a tracking current of a specific frequency, $f_1$ to $f_4$, and the tracks are recorded on the record carrier 62 in cycles of four consecutive tracks (see FIG. 8). This may mean, for example that one period of these four tracking signals may have a length of 6, 8 and 10 channel words respectively. When recording in each of these four tracks begins the signal generator 20 is therefore cyclically switched to the appropriate frequency for the signal RV.

Moreover, the number of periods of the signal RV between (the centres of) two consecutive sync words is preferably an integral number. Suitably the sync words are all identical to one another (equal DS) and should fit in the tracking signal. Therefore, they should always coincide with the same polairy of the tracking signal. The sync word now comprises two 10-bit words, of which the first word has for example a DS of +2 and the other a DS of −2. The centre of the sync word should then coincide with a zero crossing from + to − in the pilot signal. This means that an integral number of periods of the pilot signal should be situated between the centres of two consecutive sync words.

Figure 9:
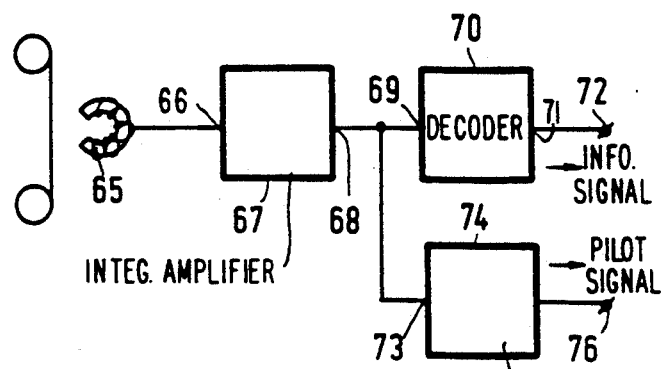
FIG. 9 is a block diagram of apparatus in accordance with the invention for reproducing a digital information signal.

Apparatus for reading the channel words and subsequently decoding said channel words into information words is shown in FIG. 9. The apparatus comprises a read head 65, which is coupled to an input 66 of an integrating amplifier 67, having an output 68 coupled to an input 69 of a decoding unit 70. The output 71 of the decoding unit 70 is coupled to the output terminal 72 of the apparatus.

The integrating amplifier has been provided to compensate for the differentiating character of the read head. The integrating amplifier 67 therefore has a frequency-response curve H(f) a portion of which rises towards lower frequencies. The curve rises towards lower frequencies at a rate of 6 dB/octave up to a specific frequency $f_0$, see FIG. 10. From this frequency another portion of the curve follows a horizontal line towards even lower frequencies. This is in order to preclude that too much low frequency noise is produced in the signal being read. The pilot signal has a frequency $f_p$ lower than $f_0$. As a result of this, owing to filtering, the amplitude of the pilot signal is reduced relative to the amplitude of the signal of the channel words, which signal is mainly situated in the frequency range above $f_0$. In fact, the pilot signal would have to be amplified by a factor ΔH, which is the difference, for $f=4_p$, between the horizontal line in FIG. 10 and the solid oblique line. In that case the pilot signal is amplified in accordance with extrapolation of the rising portion of the characteristic and so the amplitude of the pilot signal read will be restored to be in the same proportion to the amplitude of the channel words as it had at the instant it was recorded on the record carrier by the write head.

Figure 10:
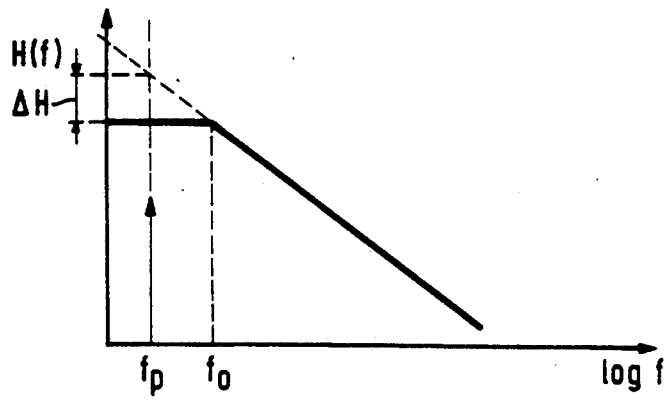
FIG. 10 shows the frequency-response curve of the integrating amplifier in the apparatus shown in FIG. 9.
Figure 11:
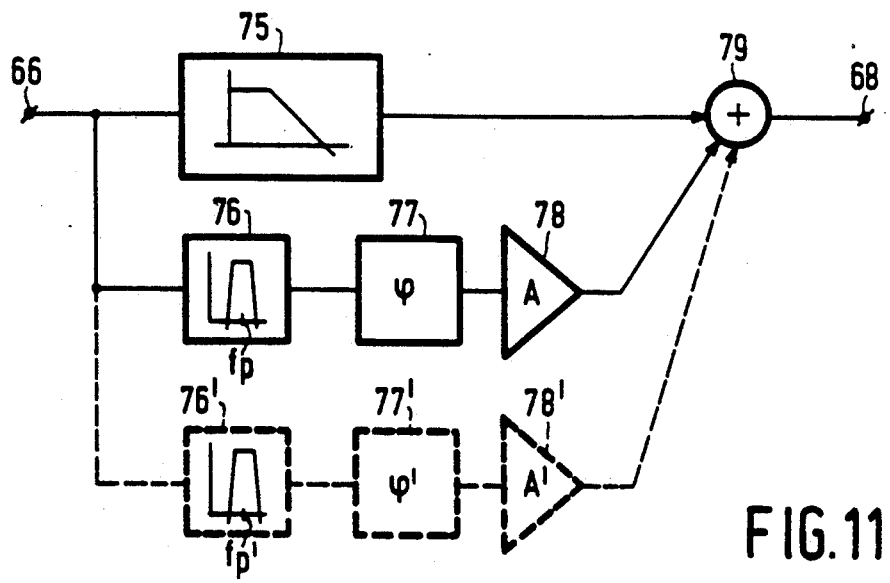
FIG. 11 shows an example such an integrating amplifier.

Another possibility to achieve this is to arrange a narrow-band filter having a central frequency $f_p$ in parallel with the filter shown in FIG. 10. This is illustrated in FIG. 11.

A narrow-band filter 76 having a central frequency $f_p$ and the filter characteristic shown in FIG. 10 is arranged in parallel with the filter 75, which narrow-band filter merely extracts the pilot signal frequency $f_p$ from the information read from the record carrier by the head 65. In order to compensate for phase shifts between the output signals of the filters 75 and 76 a phase shifter 77 is provided. The gain A of the amplifier 78 is subsequently adjusted in such a way that the signal combined in the signal-combination unit 71 has a pilot signal of the correct amplitude.

If the signal (in consecutive tracks, see FIG. 8) should comprise pilot signals of different frequencies, more band-pass filters of which only one filter 76' is indicated in broken line, together with the associated phase shifters 77' and the amplifier 87 may be aranged in parallel with the filter 75. Depending on which of the pilot signals is contained in the signal being read, preferably one parallel branch, namely the branch including the associated narrow-band filter, is switched in circuit. It will be appreciated that the reconstruction of the correct amplitude of the pilot signal as described with reference to FIG. 10 is completely independent of the manner in which the pilot signal is contained in the data stream of channel words. Such a reconstruction may therefore also be applied to the read device described in the U.S. Pat. No. 4,511,933.

The decoding unit 70 decodes the channel words back into information words, after which the original sequence of information words is obtained on the output terminal 72. Decoding is effected in a manner inverse to the encoding process during recording. Further the output 68 of the integrating amplifier is coupled to an input 73 of a processing unit 74, in which the pilot signal can be extracted from the signal. In the case of a tracking system it is then possible to derive from the pilot signal an error signal which represents a positional deviation of the read element 65 relative to the information track to be read. This error signal is applied to a terminal 76 and may be applied to a suitable servo control unit.

For possible constructions of the processing unit 74 reference is made to the afore-mentioned U.S. Pat. Nos. 4,056,832; 4,110,799 and 4,297,773.

FIG. 12a shows the output signal RV of the signal generator 20 in the case that, not only a pilot signal but also an addition information signal is to be inserted in the information stream of the channel words. The curve DSV' is the ideal sawtooth curve as a function of time for the insertion of the pilot signal in the channel words. This curve substantially corresponds to the curve DSV' in FIG. 5. The curve has a period of 32 channel words having, for example, a length of 10 bits, i.e. 320 channel bits.

FIG. 12b gives the additional information signal $I_e$ as a function of time, which signal is also to be inserted in the stream of channel words. It is evident that in the time in which one bit of the information signal $I_e$ is inserted in the information stream four information words of, for example, 8 bits long are converted into channel words having, for example, a length of 10 bits. Consequently, the information signal $I_e$ has a much lower frequency than the information stream of the channel words.

The insertion of one additional bit for every four channel words while maintaining the pilot signal can be realized as follows.

i) For the rising edge of the pilot signal:
   if the additional bit is "0", the desired disparity of these four channel words becomes, in this order, 0, 0, 2 and 2.
   if the additional bit is "1", the desired disparity of these four channel words becomes, in this order, 2, 2, 0 and 0.

ii) For the falling edge of the pilot signal:
   if the additional bit is "0", the desired disparity becomes 0, 0, −2 and −2.
   if the additional bit is "1", the desired disparity becomes −2, −2, 0 and 0.

It is to be noted that it is also possible to make the following choice for the falling edge:
   if the additional bit is "0", the desired disparity becomes −2, −2, 0 and 0.
   if the additional bit is "1", the desired disparity becomes 0, 0 −2 and −2.

The actual insertion of the additional information signal $I_e$ is effected via an additional connection terminal (not shown) of the signal generator 20 in FIG. 4. In the absence of the additional information signal the signal generator generates the desired signal DSV' in FIG. 12. Under the influence of the additional information signal $I_e$ the signal generator generates the signal RV in FIG. 12. Consequently, the control-signal unit 19 also supplies another control signal. The encoding device 12 will now select such channel words that the signal current has a digital sum value which varies substantially in accordance with the curve RV in FIG. 12.

Using the same code tables the 8-to-10 conversion has now been changed (by way of example) into a 33-to-40 conversion. The additionally inserted information is mainly situated in the baseband, thus yielding a frequency multiplex system.

Detection proceeds in the same way by an unambiguous 10-to-8 bit conversion. The additionally inserted bit can be recovered by filtering in the frequency domain or by processing the 10-bit channel words regenerated in the receiver (for example by keeping track of the disparity variation).

Figure 12:
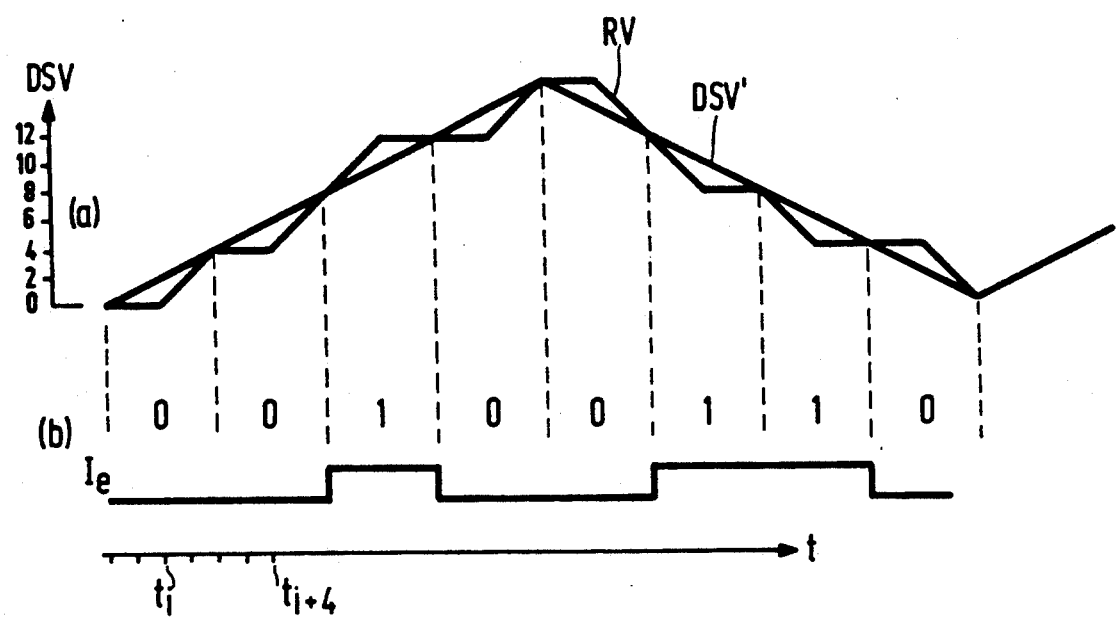
FIG. 12 illustrates the insertion of an additional information signal when a pilot signal is present.

In the example shown in FIG. 12 insertion of the additional information signal $I_e$ in the data stream is possible because the difference between DSV and RV is 0 or 2. This means that at the instants ... $t_{i-4}$, $t_i$, $t_{i+4}$ ... an unambiguous detection of the information signal $I_e$ is possible.

Figure 13:
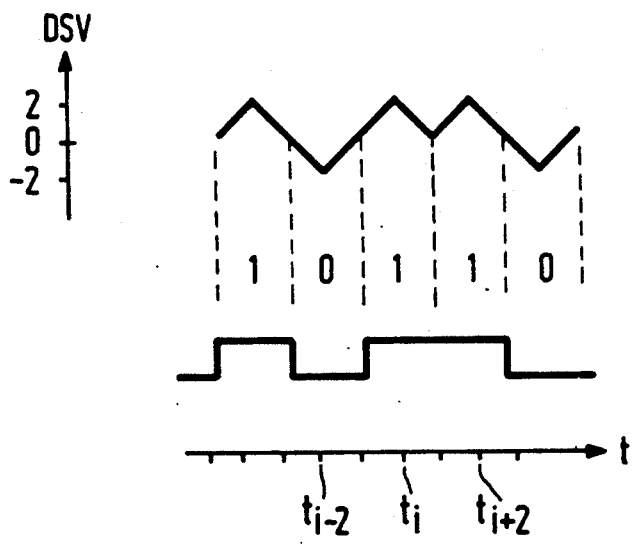
FIG. 13 illustrates the insertion of another additional information signal in the absence of a pilot signal.

FIG. 13 shows a solution for the case that no pilot signal is keyed into (for example) the 8-to-10 conversion. This is referred to as a DC-free code. In this case one additional bit is added to two channel words, so that a 17-to-20 conversion is obtained. In the present example insertion of the additional information signal is possible because now the difference between DSV and RV is also 0 or 2. This means that at the instant ... $t_{i-2}$, $t_i$, $t_{i+2}$, ... an unambiguous detection of the information signal $I_e$ is possible.

During reproduction in magnetic recording a Nyquist class-4 detection may be employed. In order to optimize the signal-to-noise ratio at the detection instants the frequency response of the receiver (the reproducing apparatus) is then adjusted in such a way that at the detection instants a specific amount of controlled intersymbol interference is produced. At the transmitting (and also at the recording) apparatus this requires the addition of a 2T-precoder, see FIG. 14. The 2T-precoder bears much resemblance to the 1T-precoder in FIG. 3, but the feedback line now includes an additional delay 2' of 1T.

The 2T-precoder has a 2-bit storage function, so that depending on the value of these two bits four different channel words can be produced during the conversion of an information word into a channel word.

This is illustrated by means of an example. Assume that the 8-bit information word 21 (the binary number 00010101) is converted, before the precoder, into the 10-bit code word 498 (the binary number 0111110010). Depending on the content of the precoder the channel words given in the following table will be generated.

| precoder content | channel word | DS |
|---|---|---|
| 00 | 0110010111 | +2 |
| 01 | 0011000010 | −4 |
| 10 | 1100111101 | +4 |
| 11 | 1001101000 | −2 |

This can also be found in FIG. 15, bearing in mind that the MSB is applied to the precoder as the first bit of word. FIG. 15 shows the conversion table for an 8-to-10 conversion and a $T_{max}$ equal to 9, a requirement to be met being that the digital sum value of the information stream of the channel words should not differ by more than ±2 from the desired digital sum value RV, see FIG. 4. The left column under "INPUT" gives the 8-bit information words from (decimal) 0 to (decimal) 255. The second column under "KW" gives the 10-bit words. However, these are the 10-bit words prior to processing in the 2T-precoder of FIG. 14.

Figure 14:
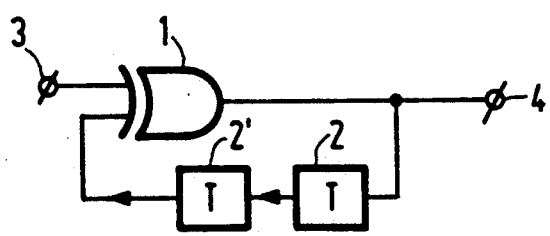
FIG. 14 shows a 2T-precoder suitable for use in the device.

Depending on the content in the 1-bit memories 2 and 2' of the precoder of FIG. 14 four channel words are produced for every 10-bit word in the column "KW". The disparity of these channel words is given in the right-hand column under DS. The two-bit binary numbers 00, 01, 10 and 11 represent the different possible contents of the 1-bit memories 2 and 2', the first bit being the content of the memory 2' and the second bit being the content of the memory 2. In other words, the last bit, which is stored in the memory 2, is the last bit of the directly preceding channel word which has just been generated by the encoding device. The first bit, which is stored in the memory 2', is the penultimate bit of the same channel word.

It will be appreciated that the recording apparatus shown in FIG. 4 is suitable for the conversion of the information words into channel words in accordance with the conversion table of FIG. 15. However, this requires a feedback from the output 13 to the input 28, for feedback of the information about the value of the last two bits of the preceding channel word. The channel words after precoding by means of the 2T-precoder then appear on the output 13 of the encoding device.

Depending on the applied information word, the (first) control signal applied to the encoder input 27, and the last two bits of the preceding channel word (the second control signal) applied to the encoder input 28, the encoder thus selects a channel word from the channel words available for this information word.

After 2T decoding, inter alia by means of channel equalization during reproduction, the 10-bit words KW of the table of FIG. 15, are recovered. Since the 10-bit words KW in the table of FIG. 15, i.e. the 10-bit words prior to precoding, are unique, the decoding device can unambiguously recover the 8-bit information words during reproduction.

It is to be noted that the invention is not limited to the embodiments disclosed herein. The invention equally applies to those embodiments which differ from the embodiments shown in respects which are not relevant to the invention. For example, the pilot signal may have a waveform other than the squarewave DS shown in FIG. 5. The pilot signal may be, for example, a sinewave signal or a signal comprising bursts of a specific frequency alternating with a zero signal. Moreover, the embodiments have been described for devices used in conjunction with a magnetic record carrier. However, this is not necessary. It is also possible to apply the teachings of the invention, the substance of it being to insert a second signal, for example a pilot signal, in the channel words, to apparatus to be used in conjunction with an optical record carrier.

I claim:

1. Apparatus for recording a digital information signal and an auxiliary digital signal in information tracks of a record carrier and, prior to recording, converting successive information words of the digital information signal into selected channel words; said apparatus comprising:

a signal generator for producing a signal (RV) representing the digital sum value (DSV) of said auxiliary signal;

an encoding device having an input for receiving the successive information words and which is adapted to convert each information word into a selected channel word of a channel code such that at least three channel words of mutually different disparities are available for each of the information words, and to supply the selected channel word to an output of the apparatus;

a control signal unit for receiving said signal (RV) from the signal generator and the channel words produced by said encoding device, and adapted to supply a control signal to said encoding device which controls it to select channel words such that the digital sum value (DSV) of the channel words which are recorded varies substantially in accordance with variations of said auxiliary signal;

the control signal unit comprising an integrating circuit for deriving the digital sum value (DSV) of the channel words which are recorded and a signal-combination unit which is adapted to derive said control signal from the difference between said digital sum value (DSV) and said (RV) signal; and feedback means connected to the output of said apparatus for deriving from the channel words produced at said output a further control signal for said encoding device; said further control signal including, for each channel word, at least the last bit of the immediately preceding channel word; said encoding device being adapted to select a channel word for the information word at its input depending on said first-named control signal and said further control signal.

2. Apparatus as claimed in claim 1, wherein said auxiliary signal is a pilot signal comprising a carrier wave of comparatively low frequency relative to the information signal, which pilot signal is to be recorded in the information tracks of said record carrier as a tracking signal for indicating the relative position transverse to the track direction of read means for reading the channel words recorded in the information tracks.

3. Apparatus as claimed in claim 1 or 2, wherein the encoding device comprises respective memories for storing respective ones of the channel words of mutually different disparities which are available for a plurality of the information words.

4. Apparatus as claimed in claim 3, wherein for certain of said plurality of information words two of the three channel words associated therewith have disparities of equal absolute value but of opposite sign.

5. Apparatus as claimed in claim 1, wherein said further control signal derived by said feedback means includes the last two bits of said immediately preceding channel word.

6. Apparatus for reading a digital information signal which is recorded in information recording tracks of a magnetic record carrier in the form of consecutive channel words having disparities such that the digital sum value (DSV) thereof varies in accordance with an auxiliary signal of comparatively low frequency relative to the information signal, the apparatus being adapted to convert the consecutive channel words read from the information tracks into information words corresponding thereto and to convert the digital sum value (DSV) of the channel words into said auxiliary signal; said apparatus comprising:

a magnetic read head for reading the recorded channel words from the information tracks on the record carrier, said read head having a differentiating characteristic;

integrating amplifier means for receiving the consecutive channel words read by the read head and having an integrating characteristic which compensates for the differentiating characteristic of the read head, said integrating amplifier means having an output at which it produces the so recovered channel words;

a decoder unit coupled to the output of the integrating amplifier means for decoding the recovered channel words into information words corresponding thereto and supplying the information words to an output terminal of the apparatus; and a processing unit also coupled to the output of the integrating amplifier means for deriving said auxiliary signal from the digital sum value (DSV) of the recovered channel words;

the integrating amplifier means comprising a first amplifier having a frequency-response characteristic a first portion of which is of substantially constant value in a first frequency range and a second portion of which rises with decreasing frequency in a second frequency range above the first frequency range, said first amplifier being adapted to selectively amplify the DSV of the recovered channel words in accordance with extrapolation of the second portion of said frequency response characteristic into said first frequency range when said auxiliary signal is in said first frequency range.

7. Apparatus as claimed in claim 6, wherein said integrating amplifier means further comprises a band-pass filter having a central frequency substantially corresponding to the frequency of said auxiliary signal, and a second amplifier in series with said filter; said series arrangement being in parallel with said first amplifier.

8. Apparatus as claimed in claim 7, wherein said series arrangement further comprises a phase shifter.

* * * * *